(12) United States Patent
Giurgica-Tiron et al.

(10) Patent No.: US 12,141,656 B2
(45) Date of Patent: Nov. 12, 2024

(54) METHODS OF OPERATING QUANTUM COMPUTING SYSTEMS FOR AMPLITUDE ESTIMATION

(71) Applicant: Goldman Sachs & Co. LLC, New York, NY (US)

(72) Inventors: Tudor Giurgica-Tiron, Palo Alto, CA (US); Farrokh Labib, Amsterdamn (NL); Iordanis Kerenidis, Paris (FR); Anupam Prakash, Berkeley, CA (US); William Joseph Zeng, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 437 days.

(21) Appl. No.: 17/532,388

(22) Filed: Nov. 22, 2021

(65) Prior Publication Data

US 2022/0164691 A1 May 26, 2022

Related U.S. Application Data

(60) Provisional application No. 63/116,712, filed on Nov. 20, 2020.

(51) Int. Cl.
*G06N 10/00* (2022.01)
*G06F 17/18* (2006.01)

(52) U.S. Cl.
CPC ............. *G06N 10/00* (2019.01); *G06F 17/18* (2013.01)

(58) Field of Classification Search
USPC ................ 716/100, 101, 103, 104, 105, 106
See application file for complete search history.

(56) References Cited

U.S. PATENT DOCUMENTS

| 10,469,087 B1 * | 11/2019 | Granade ................ G06N 20/00 |
| 11,861,457 B2 * | 1/2024 | Cao ......................... G06F 15/16 |
| 2020/0349457 A1 | 11/2020 | Low et al. |
| 2021/0287126 A1 | 9/2021 | Prakash et al. |

OTHER PUBLICATIONS

Grinko, D. et al. "Iterative Quantum Amplitude Estimation." arXiv Preprint arXiv:1912.05559v1, Dec. 11, 2019, pp. 1-10.
Li, X. et al. "A Robust Chinese Remainder Theorem with its Applications in Frequency Estimation from Undersampled Waveforms." IEEE Transactions on Signal Processing, vol. 57, No. 11, Nov. 2009, pp. 4314-4322.
PCT International Search Report and Written Opinion, PCT Application No. PCT/IB2021/060833, Mar. 1, 2022, 17 pages.
Tanaka, T. et al. "Amplitude Estimation via Maximum Likelihood on Noisy Quantum Computer." arXiv Preprint arXiv:2006.16223v2, Jul. 7, 2020, pp. 1-25.

(Continued)

*Primary Examiner* — Brian Ngo
(74) *Attorney, Agent, or Firm* — Fenwick & West LLP

(57) ABSTRACT

This disclosure relates to enhanced methods of operating quantum computing systems to perform amplitude estimation. More than that, the methods may be tuned to accommodate for specific noise levels (e.g., in given a quantum device). Embodiments also enable quantum computing systems to perform amplitude estimation faster than amplitude estimation algorithms performed using a classical (non-quantum) computer.

20 Claims, 16 Drawing Sheets

(56) References Cited

OTHER PUBLICATIONS

Wang, G. et al. "Bayesian Inference with Engineered Likelihood Functions for Robust Amplitude Estimation." arXiv Preprint arXiv:2006.09350v2, Jun. 29, 2020, pp. 1-62.
Aaronson, S. et al. "Quantum Approximate Counting, Simplified." Symposium on Simplicity in Algorithms, SIAM 2020, pp. 24-32.
Abrams, D. S. et al. "Fast Quantum Algorithms for Numerical Integrals and Stochastic Processes." arXiv Preprint arXiv:quant-ph/9908083v1, Aug. 28, 1999, pp. 1-15.
Ambainis, A. "Variable Time Amplitude Amplification and Quantum Algorithms for Linear Algebra Problems." Symposium on Theoretical Aspects of Computer Science, STACS'12, Paris, France, Feb. 2012, pp. 636-647.
Bouland, A. et al. "Prospects and Challenges of Quantum Finance." arXiv Preprint arXiv:2011.06492, Nov. 12, 2020, pp. 1-48.
Brassard, G. et al. "An Optimal Quantum Algorithm to Approximate the Mean and Its Application for Approximating the Median of a Set of Points Over an Arbitrary Distance." arXiv Preprint arXiv arXiv:1106.4267v1, Jun. 21, 2011, pp. 1-10.
Brassard, G. et al. "Quantum Amplitude Amplification and Estimation." Contemporary Mathematics, vol. 305, May 2, 2000, pp. 1-32.
Brassard, G. et al. "Quantum Counting." International Colloquium on Automata, Languages, and Programming, Springer, May 27, 1998, pp. 820-831.
Burchard, P. "Lower Bounds for Parallel Quantum Counting." arXiv Preprint arXiv:1910.04555v2, Nov. 1, 2019, pp. 1-5.
Cleve, R. et al. "Fast Parallel Circuits for the Quantum Fourier Transform." Proceedings $41^{st}$ Annual Symposium on Foundations of Computer Science, Nov. 12-14, 2000, pp. 1-22.
Erdos, P. et al. "Complete Prime Subsets of Consecutive Integers." Proceedings of the Manitoba Conference on Numerical Mathematics, 1971, pp. 1-14.
Ferrie, C. et al. "How to Best Sample a Periodic Probability Distribution, or on the Accuracy of Hamiltonian Finding Strategies." Quantum Information Processing, vol. 12, Apr. 20, 2012, pp. 1-8.
Giurgica-Tiron, T. et al. "Low Depth Algorithms for Quantum Amplitude Estimation." arXiv Preprint arXiv:2012.03348, Nov. 19, 2020, pp. 1-28.
Grinko, D. et al. "Iterative Quantum Amplitude Estimation." Npj Quantum Information, vol. 7, Mar. 19, 2021, pp. 1-6.
Grover, L. K. "A Framework for Fast Quantum Mechanical Algorithms." Proceedings of the Thirtieth Annual ACM Symposium on Theory of Computing, May 1998, pp. 53-62.
Hamoudi, Y. et al. "Quantum Chebyshev's Inequality and Applications." Proceedings of the $46^{th}$ International Colloquium on Automata, Languages, and Programming, vol. 132, Jan. 7, 2019, pp. 1-27.
Harrow, A. W. et al. "Quantum Algorithm for Linear Systems of Equations." Physical Review Letters, vol. 103, No. 15, Oct. 9, 2009, pp.
Hipp, C. et al. "On the Bernstein-v. Mises Approximation of Posterior Distributions." The Annals of Statistics, vol. 4, No. 5, Sep. 1976, pp. 972-980.
Hoeffding, W. "Probability Inequalities for Sums of Bounded Random Variables." Journal of the American Statistical Association, vol. 58, No. 301, Mar. 1963, pp. 13-30.
Jeffery, S. et al. "Optimal Parallel Quantum Query Algorithms." Algorithmica, vol. 79, Sep. 8, 2016, pp. 509-529.
Kerendis, I. et al. "Q-Means: A Quantum Algorithm for Unsupervised Machine Learning." Advances in Neural Information Processing Systems (NeurIPS 2019), Dec. 12, 2018, pp. 1-26.
Kitaev, A. Y. "Quantum Measurements and the Abelian Stabilizer Problem." arXiv Preprint arXiv:quant-ph/9511026v1, Feb. 1, 2008, pp. 1-22.
Koh, D. E. et al. "A Framework for Engineering Quantum Likelihood Functions for Expectation Estimation." arXiv Preprint arXiv:2006.09349, Jun. 16, 2020, pp. 1-52.
Li, T. et al. "Quantum Query Complexity of Entropy Estimation." IEEE Transactions on Information Theory, vol. 65, No. 5, May 2019, pp. 1-25.
Montanaro, A. "Quantum Speedup of Monte Carlo Methods." Proceedings of the Royal Society A: Mathematical, Physical and Engineering Sciences, vol. 471, No. 2181, Sep. 8, 2015, pp. 1-20.
Preskill, J. "Quantum Computing in the NISQ Era and Beyond." Quantum, vol. 2, Aug. 6, 2018, pp. 1-20.
Suzuki, Y. et al. "Amplitude Estimation without Phase Estimation." Quantum Information Processing, vol. 19, No. 75, Jan. 9, 2020, pp. 1-17.
Tanaka, T. et al. "Amplitude Estimation via Maximum Likelihood on Noisy Quantum Computer." Quantum Information Processing, vol. 20, No. 293, Sep. 4, 2021, 1-29.
Wang, D. et al. "Accelerated Variational Quantum Eigensolver." Physical Review Letters, vol. 122, No. 14, Apr. 12, 2019, pp. 1-11.
Wiebe, N. et al. "Quantum Algorithms for Nearest-Neighbor Methods for Supervised and Unsupervised Learning." Quantum Information & Computation, vol. 15, No. 3-4, Jul. 18, 2014, pp. 1-31.
Zalka, C. "Grover's Quantum Searching Algorithm is Optimal." Physical Review A, vol. 60, No. 4, Oct. 1999, pp. 1-13.

\* cited by examiner

METHODS OF OPERATING QUANTUM COMPUTING SYSTEMS FOR AMPLITUDE ESTIMATION

CROSS-REFERENCE TO RELATED APPLICATION

This application claims priority under 35 U.S.C. § 119(e) to U.S. Provisional Patent Application Ser. No. 63/116,712, "Algorithms for Quantum Amplitude Estimation With Noise," filed Nov. 20, 2020, which is incorporated herein by reference in its entirety.

BACKGROUND

1. Technical Field

This disclosure relates generally to methods of operating quantum computing systems, and more particularly, to operating noisy and low depth quantum computing systems to perform amplitude estimation.

2. Description of Related Art

Quantum Amplitude estimation algorithms aim to estimate the amplitude of a unitary operator. These algorithms typically include the execution of large quantum circuits. However, current quantum computers are noisy, limited in qubits, and limited in circuit depth (referred to as noisy intermediate scale quantum (NISQ) devices). Thus, NISQ devices may not be capable of performing amplitude estimation.

SUMMARY

Embodiments described herein relate to enhanced methods of operating NISQ devices (and other quantum computing systems) to perform amplitude estimation. More than that, the methods may be tuned to accommodate for specific noise levels (e.g., in given a NISQ device). Embodiments also enable NISQ devices to perform amplitude estimation faster than amplitude estimation algorithms performed using a classical (non-quantum) computer.

Some embodiments relate to two new low depth methods for performing amplitude estimation (AE). These methods achieve a tradeoff between the quantum speedup and quantum circuit depth. For example, for $\beta \in (0,1]$, the algorithms use $$N = O\left(\frac{1}{\epsilon^{1+\beta}}\right)$$

oracle calls and sequentially execute the oracle $$D = O\left(\frac{1}{\epsilon^{1-\beta}}\right)$$

times to perform amplitude estimation within additive error $\epsilon$. These methods interpolate between a classical algorithm ($\beta=1$) and the standard quantum algorithm ($\beta=0$) and achieve a tradeoff $ND=O(1/\epsilon^2)$. These methods bring quantum speedups for Monte Carlo methods closer to realization, as they can provide speedups with shallower circuits.

The first method (Power law AE) uses power law schedules. The methods works for $\beta \in (0,1]$ and some embodiments have provable correctness when the log-likelihood function satisfies regularity conditions specified by the Bernstein Von-Mises theorem.

The second methods (QoPrime AE) uses the Chinese remainder theorem for combining lower depth estimates to achieve higher accuracy. The method works for discrete $\beta=q/k$, where $k \geq 2$ is the number of distinct coprime moduli used by the method and $1 \leq q \leq k-1$. Some embodiments have a fully rigorous correctness proof.

Additionally, this disclosure analyzes both methods in the presence of depolarizing noise and provides numerical comparisons with other amplitude estimation algorithms.

Other aspects include components, devices, systems, improvements, methods, processes, applications, non-transitory computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

where N is the number oracle calls optimized over parameters k and q.

Figure 5:
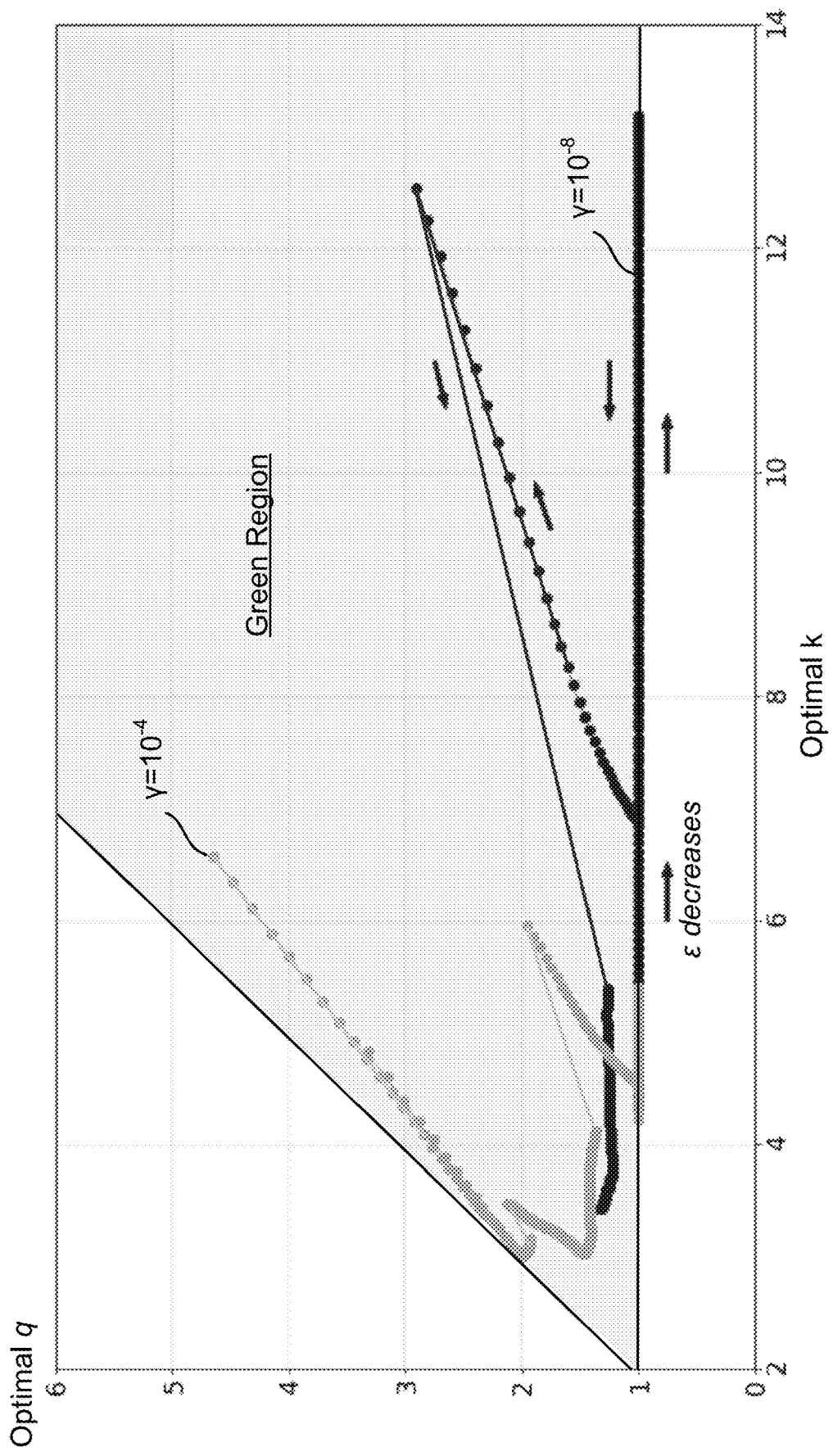

FIG. 5 illustrates a plot of the trajectory of optimal estimates for k, q parameters.

Figure 6:
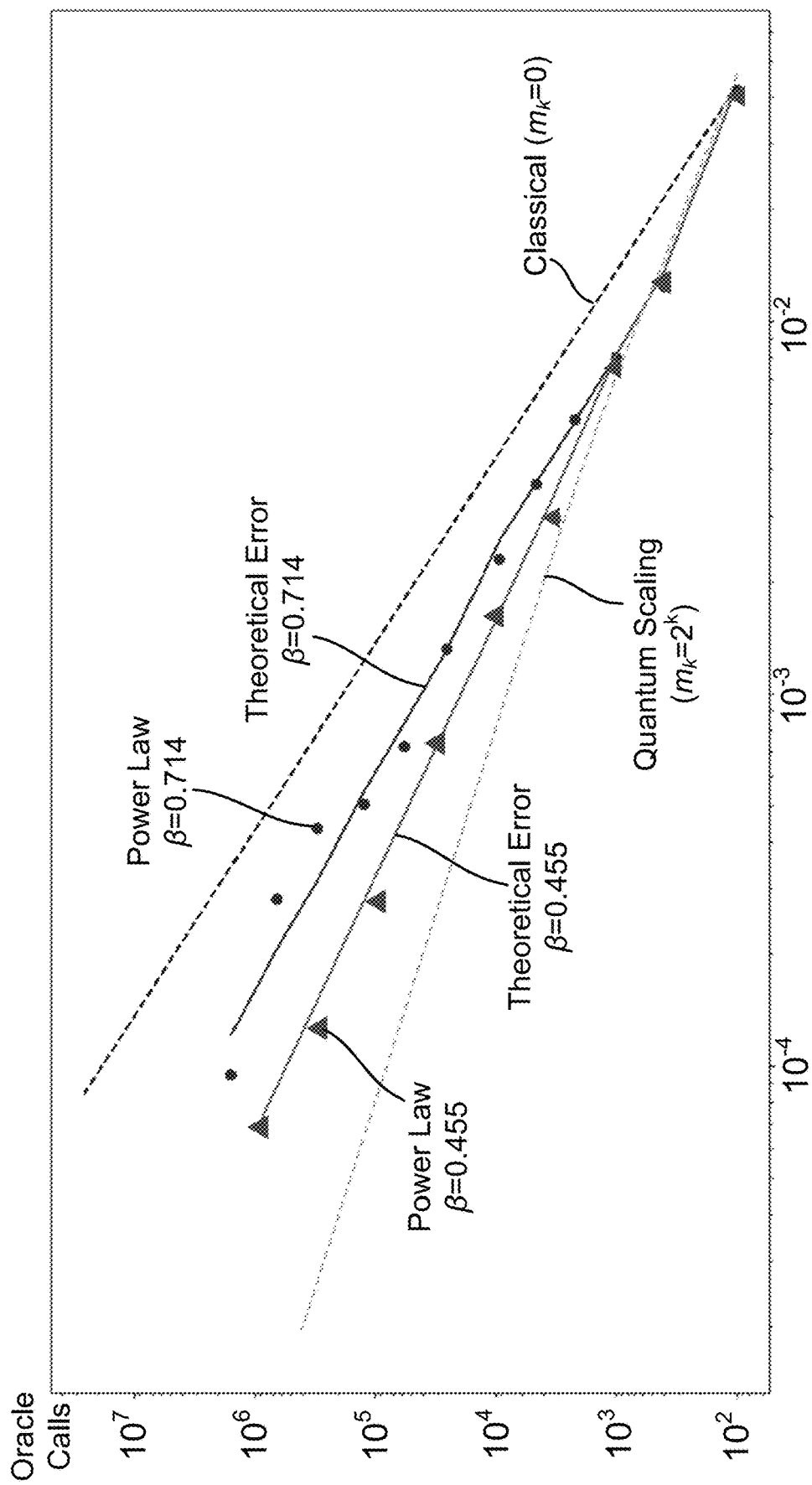

FIG. 6 illustrates a plot of the performance of the Power Law algorithm in theory (solid lines) and practice (dots and triangles) using the schedule $$m_k = \left\lfloor k^{\frac{1-\beta}{2\beta}} \right\rfloor$$

for values $\beta=0.455$ and $\beta=0.714$, for different error rates $\epsilon$.

Figure 7:
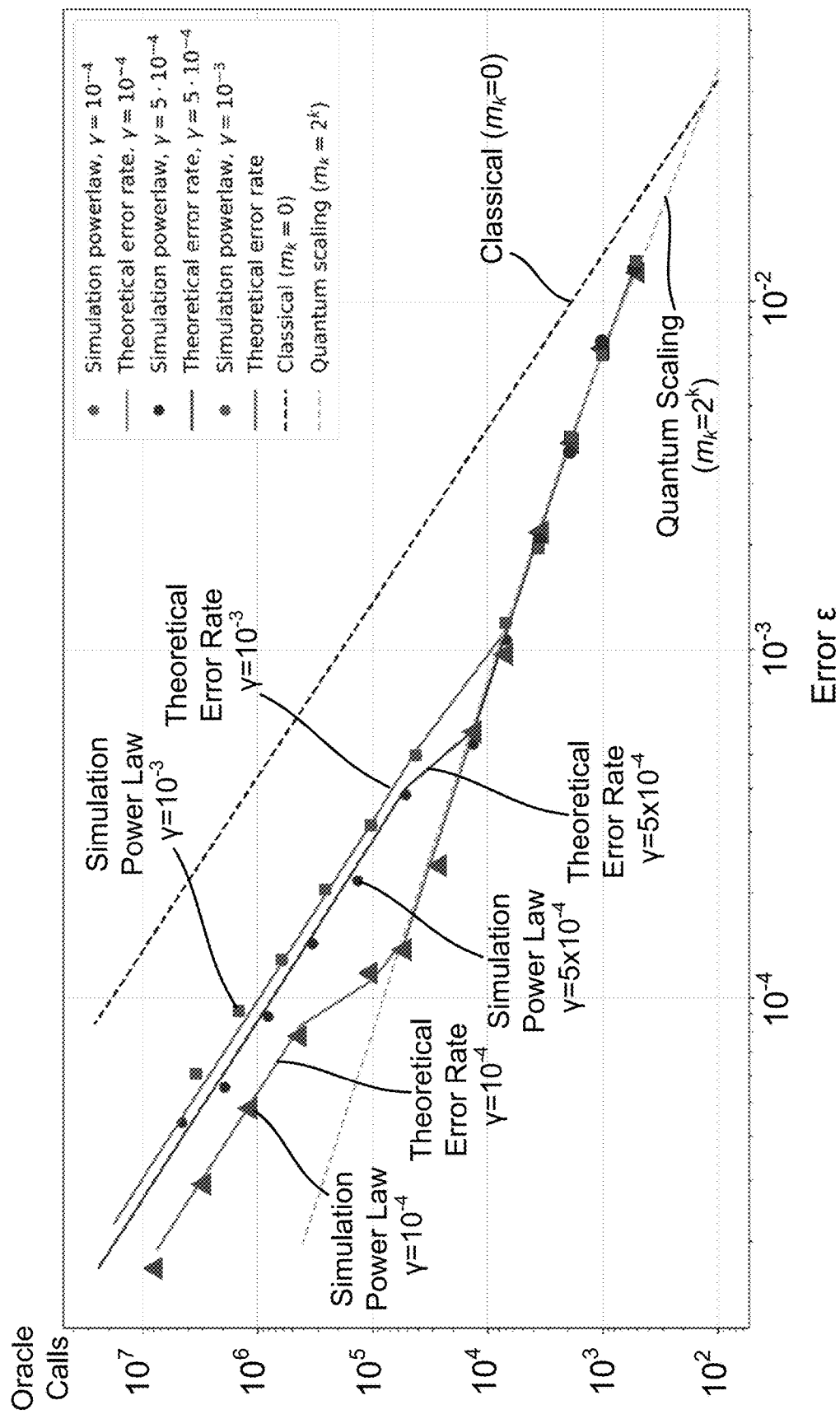

FIG. 7 illustrates a plot of the performance of the Power Law algorithm in theory (solid lines) and practice (dots, triangles, and squares) using power law schedules where the parameter $\beta$ is improved (e.g., optimized) for given $\epsilon$ and $\gamma$.

Figure 8:
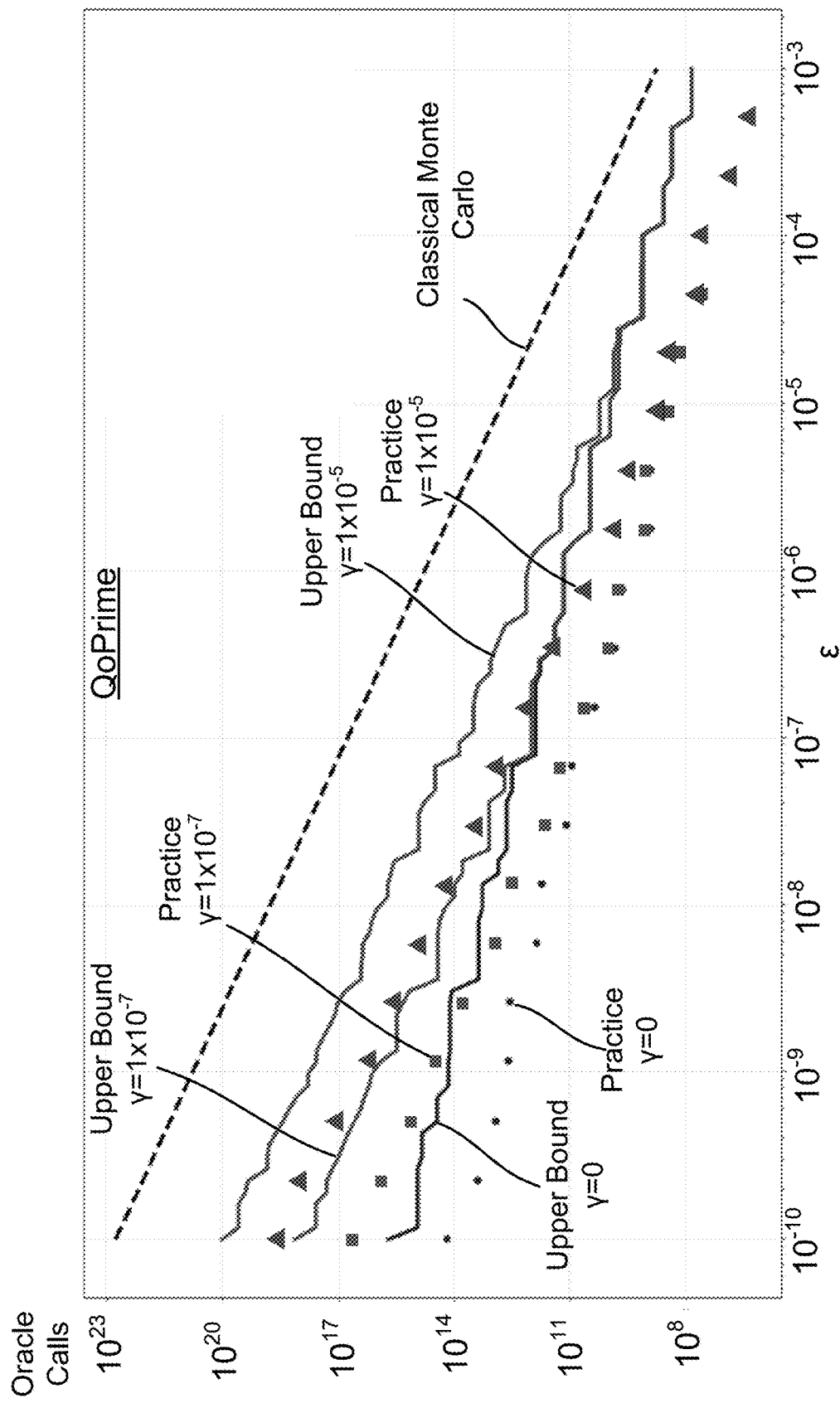

FIG. 8 illustrates a plot of the performance of the QoPrime algorithm under several noise levels ($\gamma$).

Figure 9:
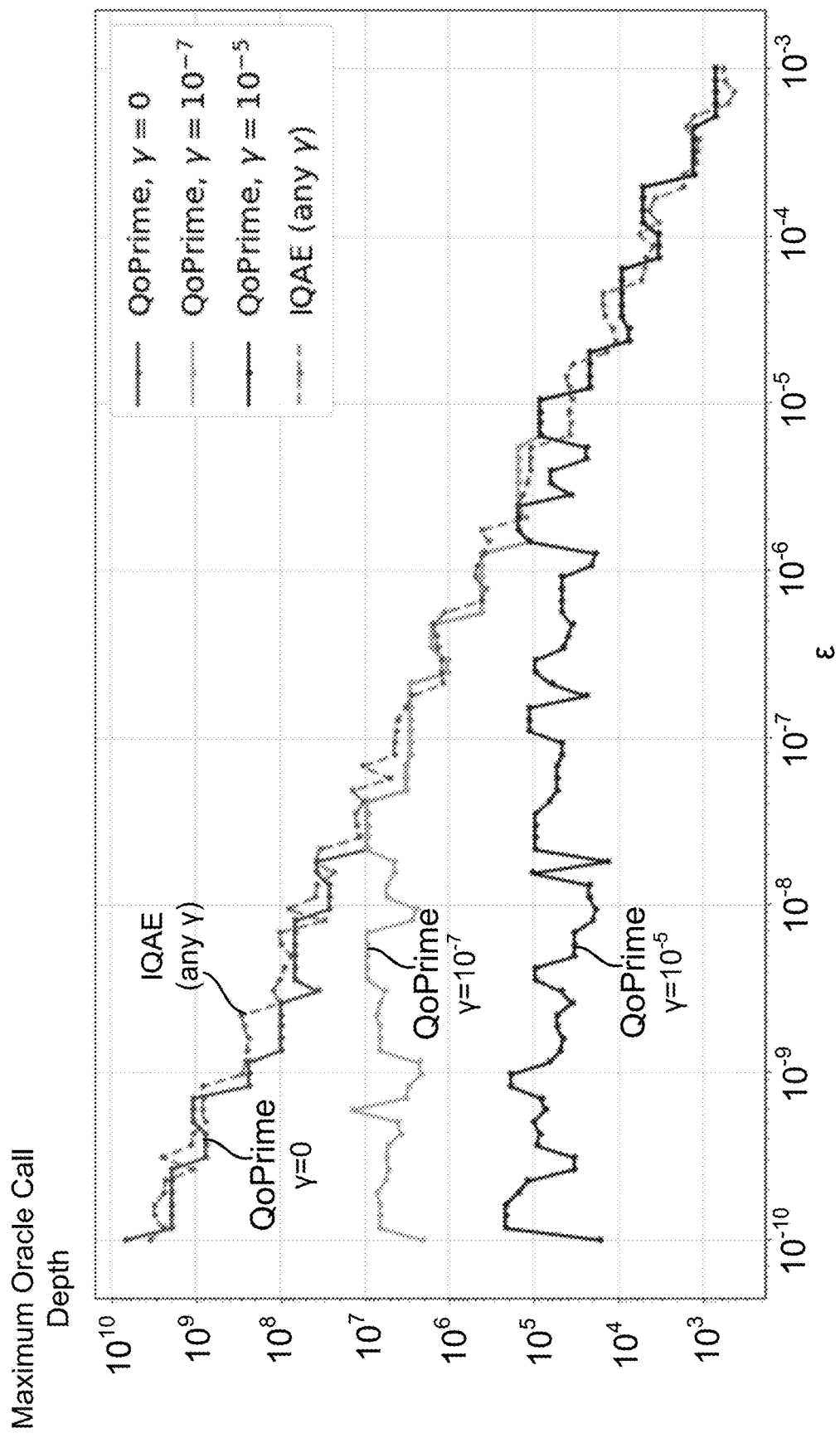

FIG. 9 illustrates a plot of the maximum oracle depth as a function of the target precision $\epsilon$.

Figure 10:
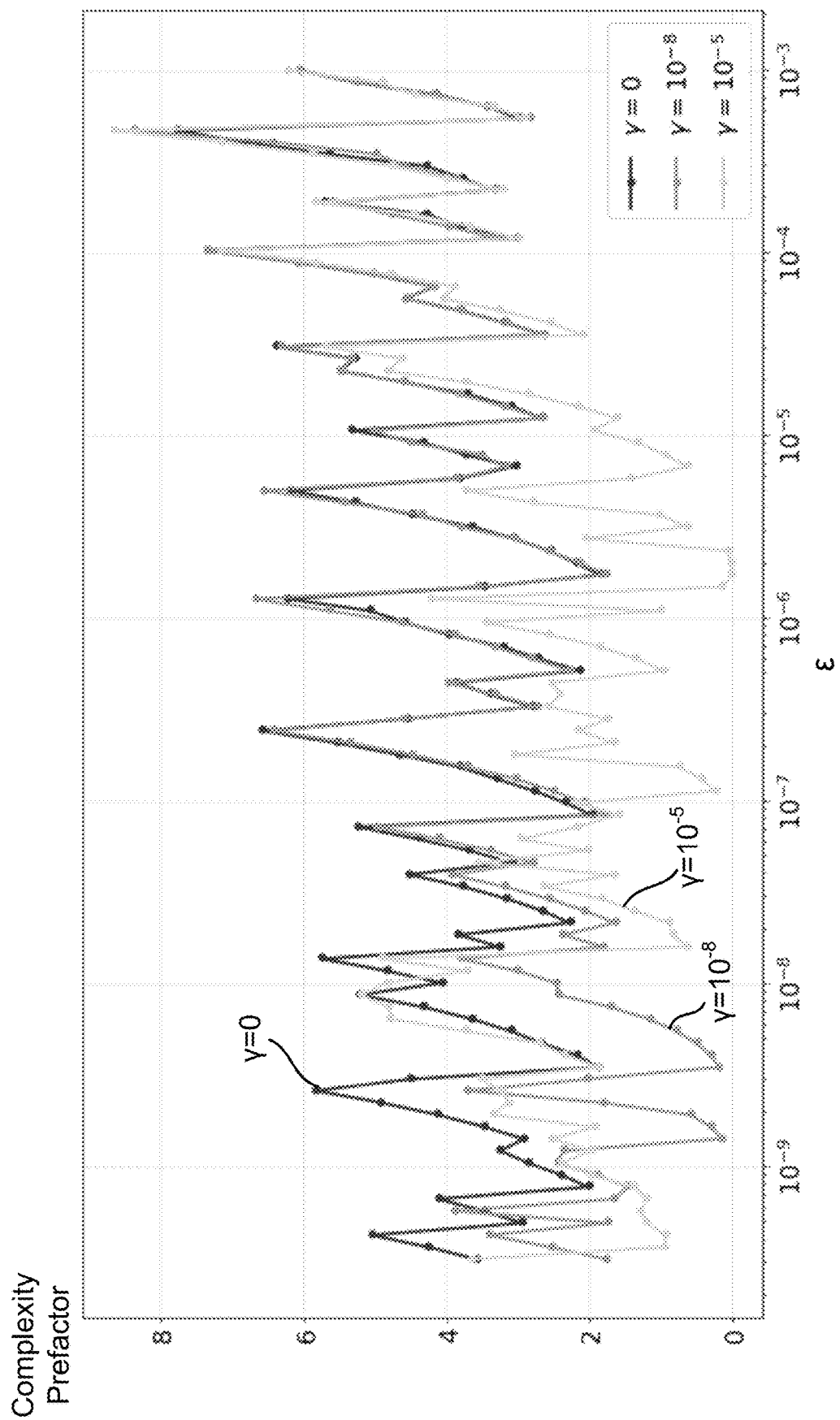

FIG. 10 illustrates a plot of empirical values for the constant prefactor C, as described in equation (21).

Figure 11:
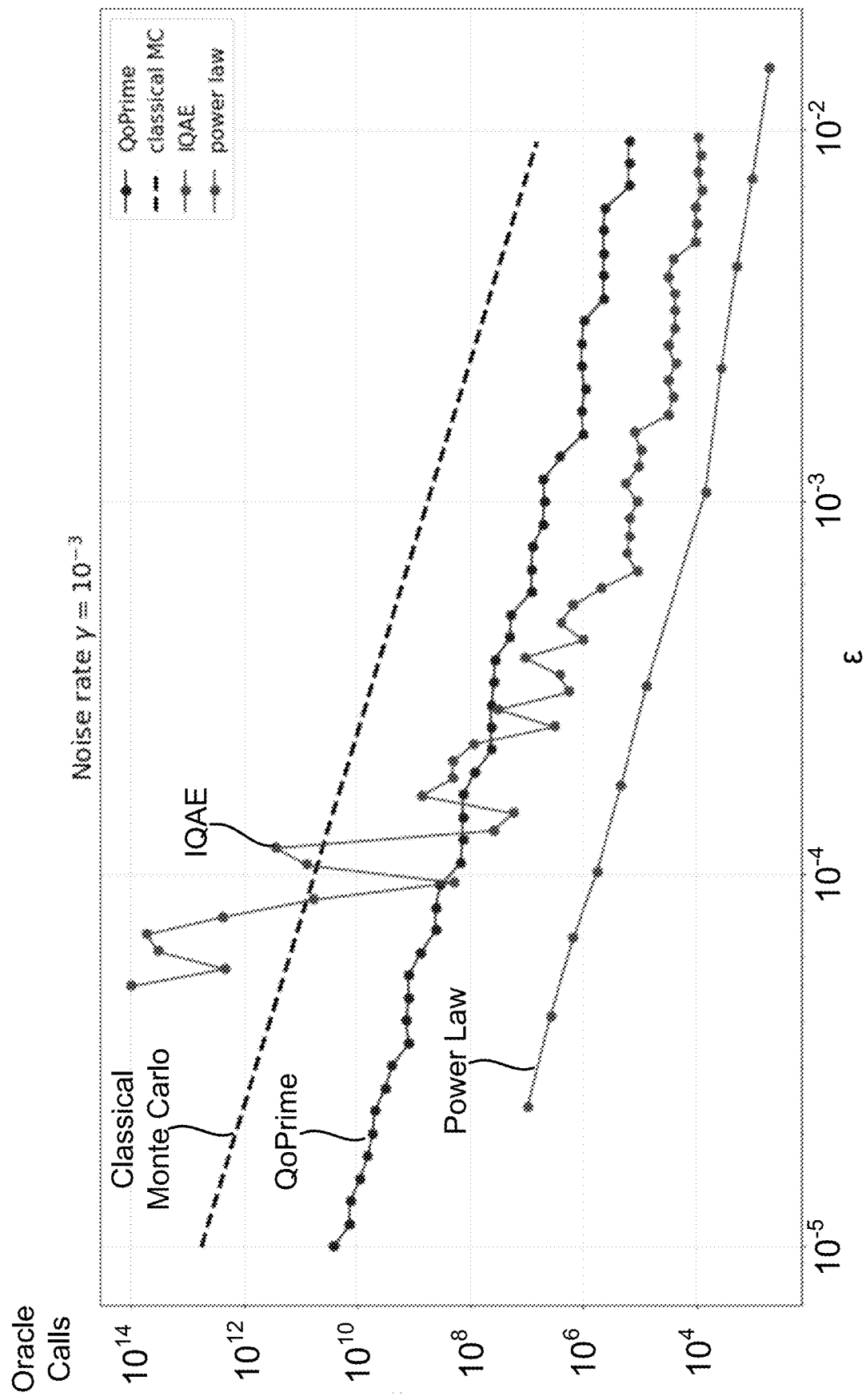

FIG. 11 illustrates a plot the performances of the Power Law algorithm, the QoPrime algorithm, and the Iterative Quantum Amplitude Estimation (IQAE) algorithm for the noise level of $\gamma=10^{-3}$.

Figure 12:
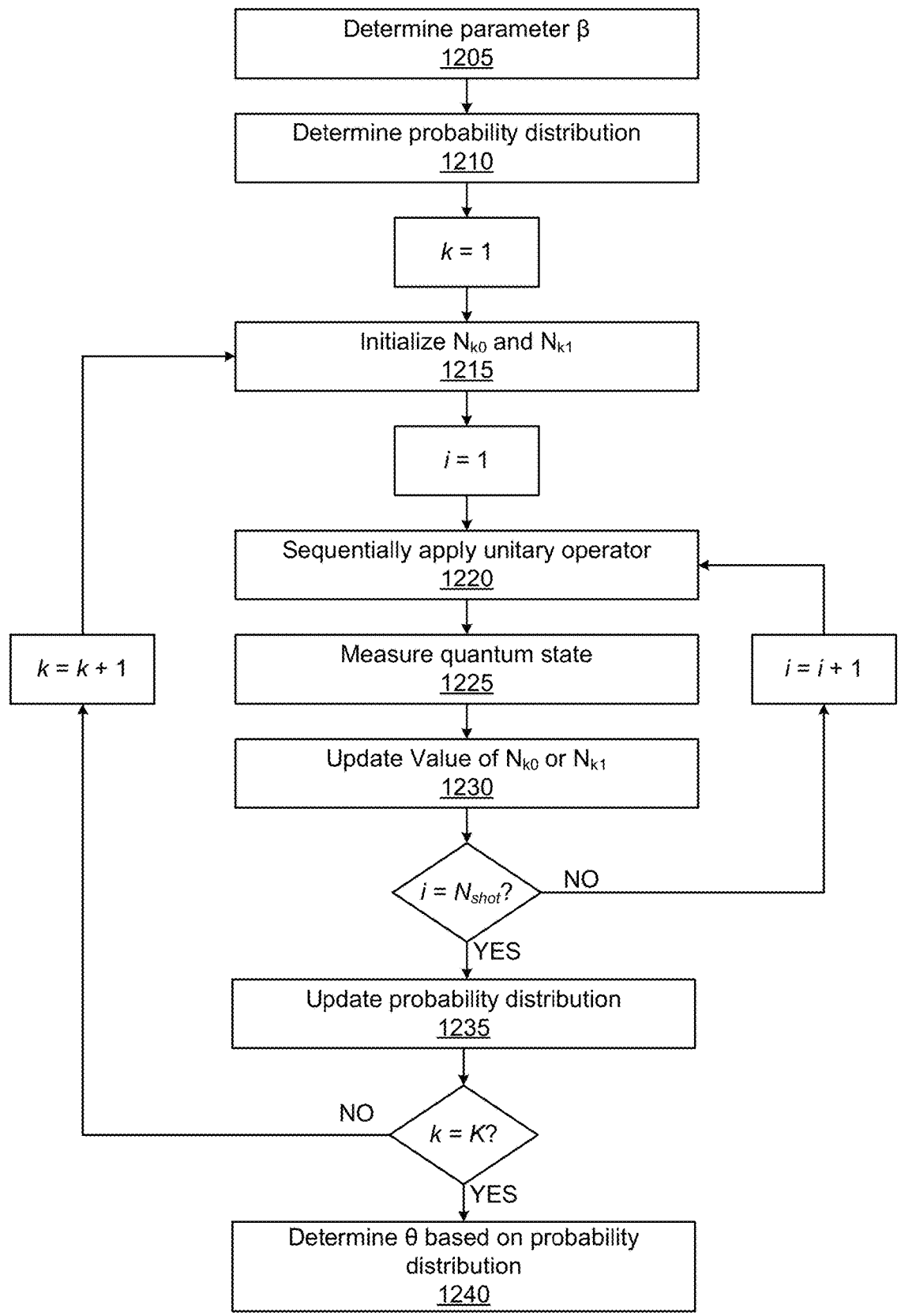

FIG. 12 is a flow chart illustrating a first method of operating a quantum computer to determine θ of a unitary operator U within an error ϵ.

Figure 13:
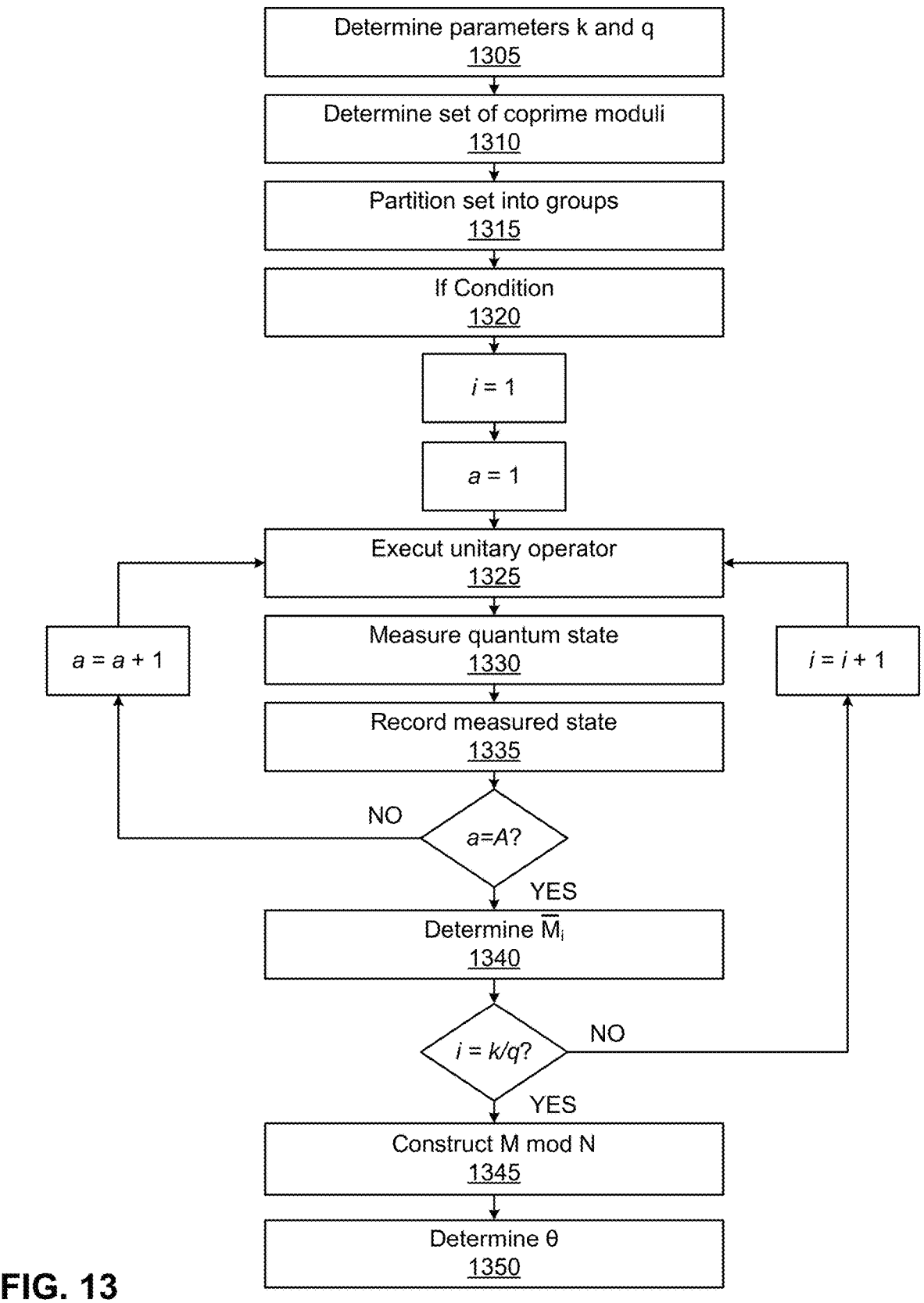

FIG. 13 is a flow chart illustrating a second method of operating a quantum computer to determine θ of a unitary operator U within an error ϵ.

Figure 14A:
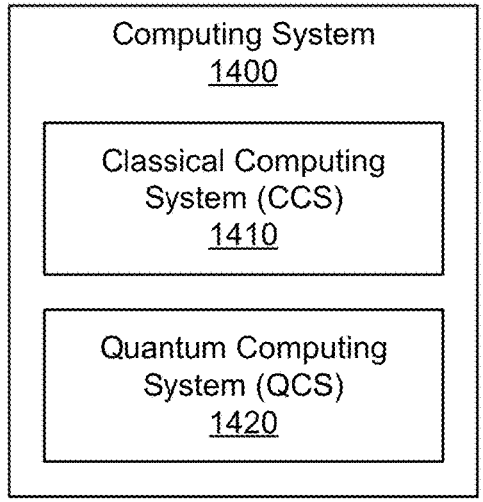

FIG. 14A is a block diagram that illustrates an embodiment of a computing system.

Figure 14B:
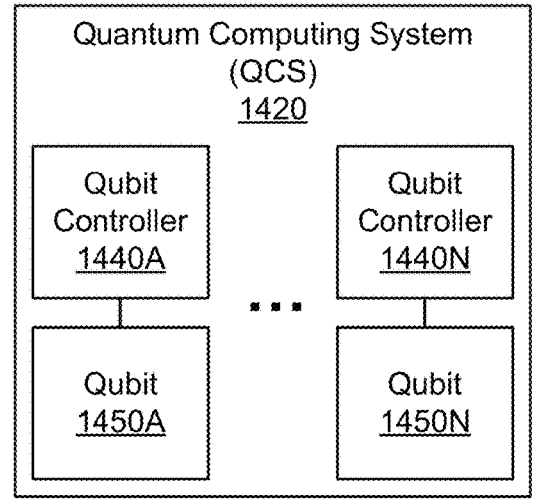
Figure 14C:
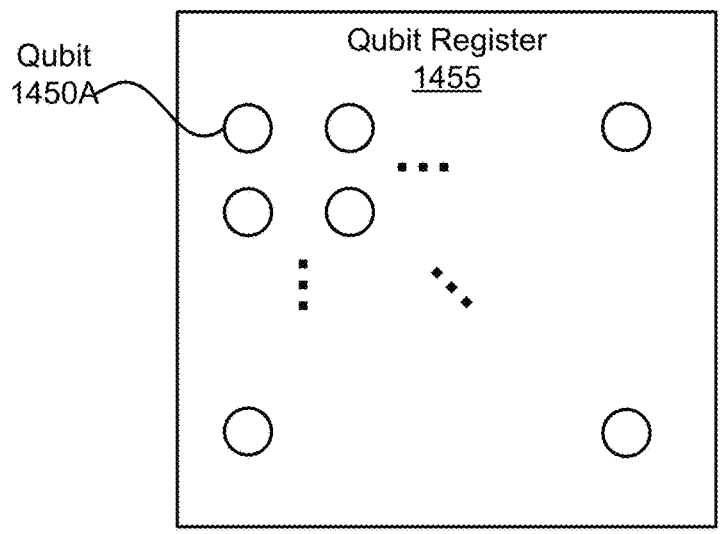

FIGS. 14B-14C are block diagrams that illustrate embodiments of a quantum computing system.

Figure 14D:
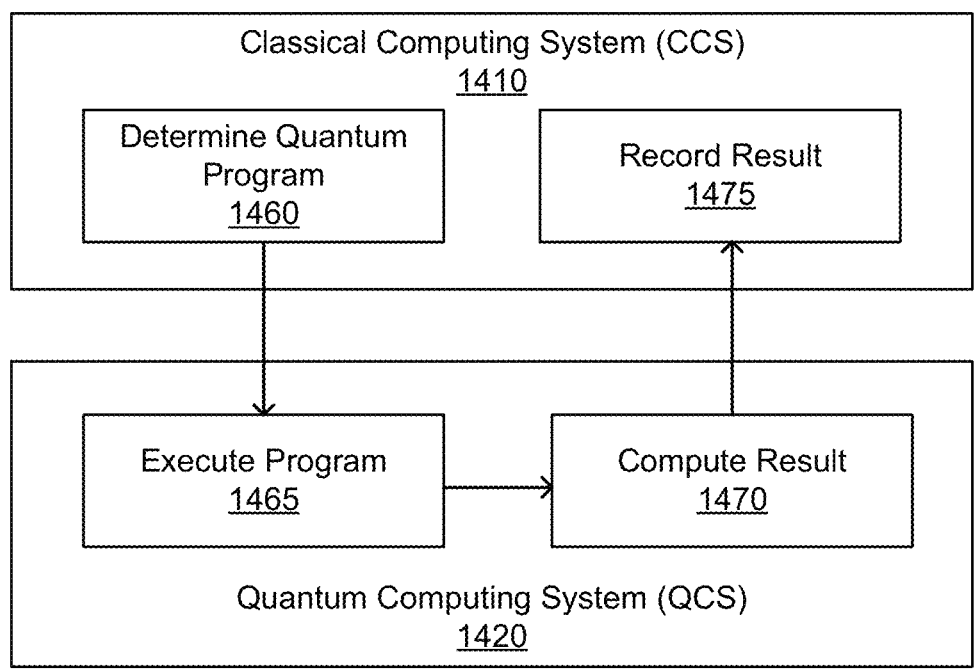

FIG. 14D is a flow chart that illustrates an example execution of a quantum routine on the computing system.

Figure 15:
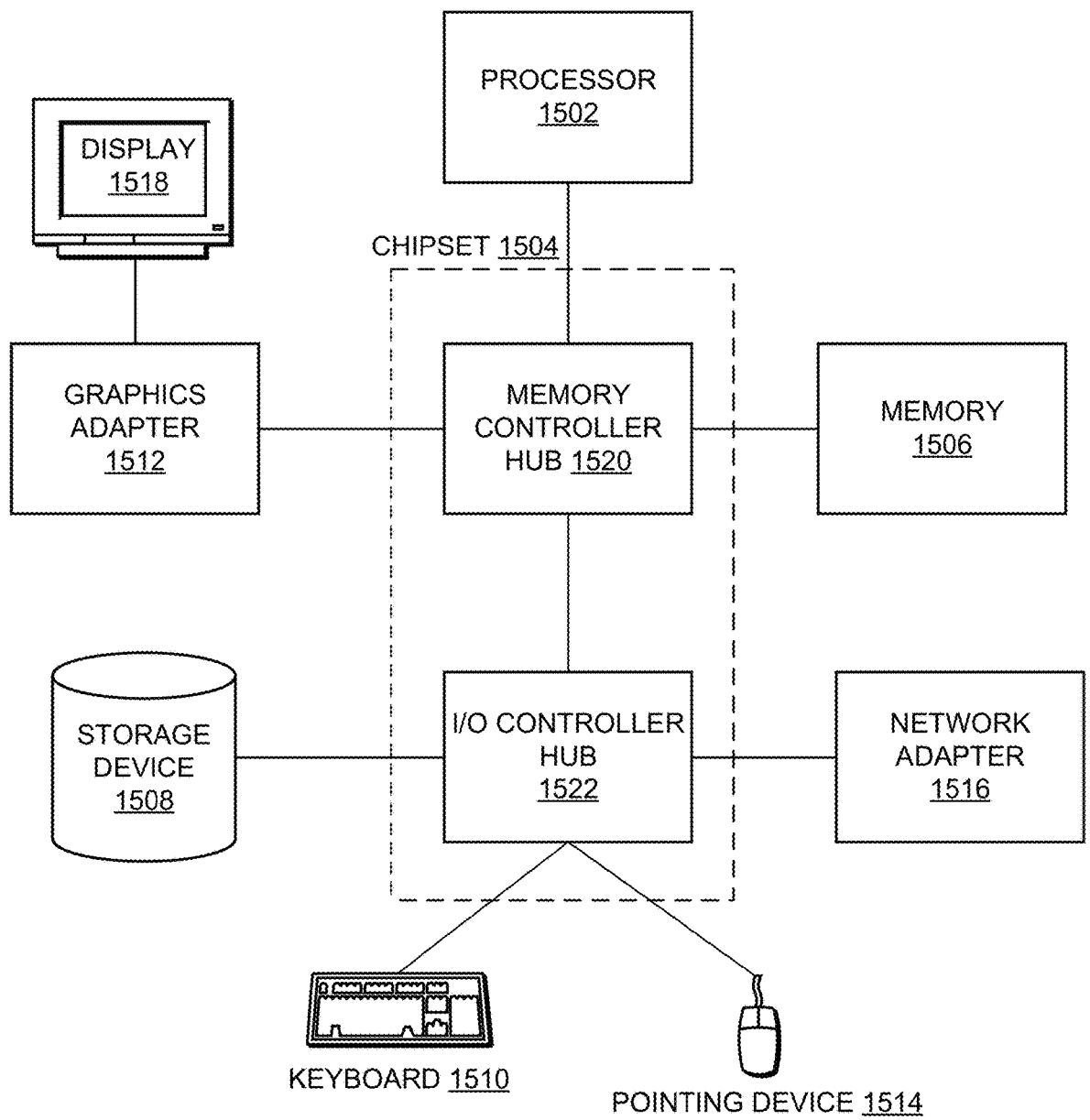

FIG. 15 is an example architecture of a classical computing system.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

1. Introduction

Amplitude estimation (AE) describes quantum algorithms that allow a quantum computing system to estimate the amplitude $\langle 0|U|0 \rangle$ for a quantum circuit U to additive error ϵ. U may also be referred to as a unitary operator. A unitary operator may perform a unitary operation (e.g., when executed by a quantum computing system). The number of calls to U depends on the type of amplitude estimation algorithm. In some cases, the number of calls to U scales with $O(1/\epsilon)$. Thus, these algorithms may offer a quadratic advantage over classical sampling (which scales as $O(1/\epsilon^2)$) and have many applications including speedups for Monte Carlo methods and approximate counting.

Generally, amplitude estimation includes a quantum circuit U applied to a register including t qubits, such that $U|0^t\rangle = \cos(\theta)|x, 0\rangle + \sin(\theta)|x', 1\rangle$, where $|x\rangle$ and $|x'\rangle$ are arbitrary states on (t−1) qubits and $|0\rangle$ and $|1\rangle$ are the two possible states of the remaining qubit (this may be referred to as the "last" qubit). More generally, U may affect more than one qubit and the resulting state of interest may be referred to as the marked state. The goal is to estimate the amplitude θ within an additive error ϵ. The related approximate counting problem corresponds to the special case where $$U|0^t\rangle = \frac{1}{2^{(t-1)/2}} \left( \sum_{i \in S} |i\rangle|0\rangle + \sum_{i \notin S} |i\rangle|1\rangle \right)$$

is a uniform superposition (where all amplitudes are the same) over bit strings of length (t−1) and the binary label on the last qubit is the indicator function for $S \subseteq \{0,1\}^{t-1}$. Amplitude estimation in this setting provides an estimate for |S|. Approximate counting in turn generalizes Grover's search and the problem of finding the number of marked elements in a list.

This disclosure discusses two applications of amplitude estimation: (1) to quantum Monte Carlo methods and (2) inner product estimation. These applications may be relevant for finance calculations, optimization, machine learning, linear algebra computations.

Quantum Monte Carlo methods are an application of amplitude estimation to the problem of estimating the mean of a real valued random variable by sampling. Let $f(x, S)$ be a real valued function where x is the input and S is the random seed and let σ be the variance of $f(x, S)$. Classically estimating the mean $E_S f(x, S)$ to additive error E is known to require $N=O(\sigma^2/\epsilon^2)$ samples. In contrast, quantum amplitude estimation can be used to estimate the mean using $$N = \tilde{O}\left(\frac{\sigma}{\epsilon}\right)$$

samples, thus quadratically improving the dependence on σ and 1/ϵ. For example, in a finance calculation, one often needs accuracy of ϵ=0.001 which implies that the number of samples can be reduced by a factor 1000× when using a quantum algorithm.

Amplitude estimation also has applications which are not reducible to approximate counting, for example, where the goal is to estimate $\langle 0|U|0 \rangle$ for a general unitary operator U. Some examples of this kind include applications of amplitude estimation to quantum linear algebra and machine learning. For example, quantum procedures for estimating the inner product $\langle x|y \rangle$ between vectors x, y∈ℝ$^n$ may be useful for quantum classification and clustering algorithms. Amplitude estimation may be used to achieve quantum speedup for this inner product estimation. For example, amplitude estimation may use $O(1/\epsilon)$ samples as opposed to the $O(1/\epsilon^2)$ samples, which is the number of samples used classically for estimating the inner product to error ϵ. Amplitude estimation variants may also be beneficial for reducing the condition number dependence K in the linear system solvers from $O(\kappa^2)$ to $O(\kappa)$. This reduces the running time and also the depth of the linear system solver quantum circuit by a factor of κ, which in many cases is more than a 100×.

Some amplitude estimation algorithms (e.g., referred to as standard amplitude estimation algorithms) invoke a controlled version of the quantum circuit U at least $O(1/\epsilon)$ times in series. Afterwards a quantum Fourier transform is performed to estimate amplitudes to error ϵ (e.g., using a phase estimation algorithm). This makes applications of amplitude estimation, like Monte Carlo methods or approximate counting, prohibitive for near term hardware because, even in cases where the oracle itself does not have significant depth, the high number of oracle calls in series makes the total depth of the circuits prohibitive for the high noise rates of current noisy intermediate scale quantum (NISQ) devices. In summary, depending on the depth of the circuit U and the number of sequential executions, NISQ devices may be incapable of running amplitude estimation algorithms. Thus, it may be advantageous to reduce the resources used for amplitude estimation algorithms so that they can be executed by NISQ devices.

Table 1 lists several amplitude estimation algorithms along with the resources used. Specifically, Table 1 illustrates asymptotic tradeoffs for various amplitude estimation algorithms. In the table, n is the number of qubits, d is the circuit depth for a single application of U, ϵ is the additive error, β∈(0,1], k≥2, and q∈[k−1]. The approximate counting algorithm is included for reference, but it requires extra structure and is not strictly an amplitude estimation algorithm.

| Algorithm | Qubits | Depth | Number of Calls |
|---|---|---|---|
| Standard Amplitude Estimation | $n + \log(1/\epsilon)$ | $d \cdot \frac{1}{\epsilon} + \log\log(1/\epsilon)$ | $\frac{1}{\epsilon}$ |
| QFT Free Amplitude Estimation | n | $d \cdot \frac{1}{\epsilon}$ | $\frac{1}{\epsilon}$ |
| Approximate Counting | n | $d \cdot \left(\frac{1}{\epsilon}\right)^{1-\beta} \log(1/\epsilon)$ | $\left(\frac{1}{\epsilon}\right)^{1+\beta} \log(1/\epsilon)$ |
| IQAE | n | $d \cdot \frac{1}{\epsilon}$ | $\frac{1}{\epsilon}$ |
| Power-Law Amplitude Estimation | n | $d \cdot \left(\frac{1}{\epsilon}\right)^{1-\beta}$ | $\left(\frac{1}{\epsilon}\right)^{1+\beta}$ |
| QoPrime Amplitude Estimation | n | $d \cdot \left(\frac{1}{\epsilon}\right)^{1-q/k}$ | $\left(\frac{1}{\epsilon}\right)^{1+q/k}$ |

The Power-Law and QoPrime algorithms are described in this disclosure. In contrast to the other algorithms in Table 1, these algorithms may be executed by NISQ devices. These algorithms were motivated by the following question: can quantum amplitude estimation algorithms that use quantum circuits with depth (e.g., asymptotically) less than $O(1/\epsilon)$ provide any speed up compared to classical algorithms (which scale as $O(1/\epsilon^2)$)? Thus, this disclosure focuses on algorithms that interpolate between classical and quantum amplitude estimation. At a high level, amplitude estimation with a classical computer uses $O(1/\epsilon^2)$ applications of the oracle, but these applications may be performed in parallel. The standard quantum amplitude estimation algorithm on the other hand uses $O(1/\epsilon)$ serial applications of the oracle, but this computation may be performed once. This disclosure presents two new and different algorithms that interpolate between the classical and quantum settings with a tradeoff of $ND=O(1/\epsilon^2)$, where N is the total number of oracle calls and D is the maximum number of sequential oracle calls that occurs during any single run of the quantum computing system.

As used herein, sequential or serial oracle calls refers to executing U "back-to-back" a number of times to generate a quantum state. This may be performed by generating a quantum circuit that includes U a number of times in a sequence. The quantum computing system may then be instructed to execute the circuit. The quantum state may then be measured afterwards.

The Power law Amplitude Estimation Algorithm

Our first algorithm utilizes the framework proposed by Suzuki et al. for quantum Fourier transform (QFT) free amplitude estimation (Y. Suzuki, S. Uno, R. Raymond, T. Tanaka, T. Onodera, and N. Yamamoto, "Amplitude estimation without phase estimation," Quantum Information Processing, vol. 19, no. 2, p. 75, 2020). In the Suzuki et al. framework, the oracle is invoked with varying depths, and then measurements in the standard basis are performed, followed by classical maximum likelihood post-processing to estimate the amplitude. Algorithms in this framework are specified as schedules $(m_k, N_k)$ where the oracle is applied $m_k$ times in series for $N_k$ iterations, and, at the end, the results are post-processed classically using maximum likelihood estimation.

Specifically, Suzuki describes a QFT free amplitude estimation algorithm that uses an exponential schedule with depths $m_k=2^k$ all the way up to the maximum depth of $O(1/\epsilon)$ and chooses $N_k=N_{shot}$ to be a constant. The quantum Fourier transform step at the end of the algorithm is eliminated. However, the asymptotic efficiency of max-likelihood post-processing is not established rigorously.

The power law amplitude estimation algorithm (Power law AE) of this disclosure uses power law schedules with constant $N_k=N_{shot}$ and $$m_k = \left\lfloor k^{\frac{1-\beta}{2\beta}} \right\rfloor,$$

where k starts from 1 and increases until the maximum depth for the quantum circuit is $O(1/\epsilon^{1-\beta})$ for $\beta \in (0,1]$ ("(" is exclusive and "]" is inclusive), at a cost of more parallel runs with the total number of oracle calls scaling as $O(1/\epsilon^{1+\beta})$. When $\beta$ tends to 0, the schedule approaches the exponential schedule, while when $\beta$ is equal to 1, the algorithm is the one where we only sample directly from the oracle as in the case of sampling with a classical computer. The analysis of the power law amplitude estimation is based on the observation that maximum likelihood estimation in this setting is equivalent to sub-dividing the domain for the amplitude $\theta$ into $O(1/\epsilon)$ equal parts and performing Bayesian updates starting from a uniform prior probability distribution, where every value has equal probability of being the correct one. In some embodiments, if the prior and the log-likelihood function (described later) are sufficiently regular, the Bernstein Von-Mises theorem can be used (also described later), which can be viewed as a Bayesian central limit theorem that quantifies the rate of convergence to the Bayesian estimator to the normal distribution centered at the true value of $\theta$ with variance $1/(N_{shot} I_f(\alpha))$, where $\alpha = \cos^2(\theta)$. The variant of the Bernstein Von-Mises theorem may be helpful for the analysis as it bounds the rate of convergence of the posterior distribution to the normal distribution in the $\ell_1$ norm. The tradeoff $ND=O(1/\epsilon^2)$ follows from Fisher information calculations for the power law schedules.

This disclosure also studies the behavior of the power law algorithm in the presence of (e.g., depolarizing) noise and describes a method to make the power law algorithm robust to noise. In fact, this disclosure provides a method for choosing the (e.g., optimal) parameter $\beta$ given a desired accuracy and noise level. One can view the power law algorithm as a (e.g., optimal or improved) method of utilizing the power of the available quantum circuit in terms of depth. Said differently, instead of waiting for quantum circuits to have good enough fidelity to apply sequentially a number of oracle calls of the order of $1/\epsilon$, (which, for Monte Carlo applications, can grow between $10^3$ to $10^6$) the power-law amplitude estimation algorithm may use quantum circuits of less depth (e.g., any depth provided by a NISQ device) and provide a corresponding speedup.

Aspects of the analysis described above assumes regularity conditions on the log-likelihood and the prior for the Bernstein Von-Mises theorem. These regularity conditions may be difficult to verify, even though they seem to hold empirically for the log-likelihood function for amplitude estimation. It therefore may be desirable to have an amplitude estimation algorithm achieving the same $ND=O(1/\epsilon^2)$ tradeoffs that does not rely on these conditions. Thus, we determined a schedule that increases (e.g., maximizes) the Fisher information for a given number of oracle calls. The (e.g., optimal) determined solution may be a schedule that makes oracle calls at the maximal possible depth. However, making oracle calls only at a particular depth may not be sufficient for amplitude estimation due to the periodicity of the function $\cos^2((2k+1)\theta)$, meaning it may be difficult (or impossible) to differentiate between different values of $\theta$ that result to the same value of $\cos^2((2k+1)\theta)$. This led us to consider amplitude estimation algorithms that execute circuits at two (or more) different depths and combine the results, leading to the QoPrime amplitude estimation algorithm.

The QoPrime Amplitude Estimation algorithm

Our second amplitude estimation algorithm (QoPrime AE) uses a number theoretic approach to amplitude estimation that may enable a fully rigorous correctness proof and may have a similar or same depth vs. number of oracle calls tradeoff (ND=O($1/\epsilon^2$)) as the power-law amplitude estimation for a set of exponents that take discrete values between 0 and 1.

The idea for the QoPrime amplitude estimation algorithm is to choose k different co-prime moduli, each close to $O(1/\epsilon^{1/k})$, so their product is $N=O(1/\epsilon)$, where N is the total number of oracle calls. The true value of the amplitude $\theta$ may be defined to be $\pi M/2N$ where $M \in [0, N]$. The algorithm estimates $\lfloor M \rfloor \bmod N_i$, where $N_i$ is the product of q out of the k moduli using $N/N_i$ sequential calls to the oracle followed by measurements (e.g., in the standard basis). These low accuracy estimates of the amplitude are then combined using the Chinese remainder theorem to obtain $\lfloor M \rfloor \bmod N$ while the fractional (non-integer) part of M is estimated separately. As an example, the QoPrime algorithm is explained for the simplest case of k=2 moduli. this case corresponds to an algorithm with $D=O(1/\epsilon^{1/2})$ and $N=O(1/\epsilon^{3/2})$, where N is the total number of oracle calls and D is the maximum number of sequential oracle calls. Let a and b be the two largest co-prime numbers less than the depth $D=O(1/\sqrt{\epsilon})$. For simplicity, assume that the true value for $\theta$ is of the form $$\frac{\pi M}{2(2a+1)(2b+1)}$$

for some integer $M \in [0,(2a+1)(2b+1)]$. The QoPrime algorithm thus determines M mod(2a+1) and M mod(2b+1) and then determines M using the Chinese remainder theorem.

Invoking the oracle a times in series followed by a measurement (e.g., in the standard basis) is equivalent or similar to sampling from a Bernoulli random variable with a success probability of $\cos^2((2a+1)\theta)$. As a function of $\theta$, this probability is periodic with period $$\frac{\pi}{2a+1}$$

and is therefore a function of ±M mod(2b+1). Subdividing the interval [0, $\pi/2$] into (2b+1) equal parts, it follows from the additive form of the Chernoff bounds that ±M mod(2b+1) can be recovered with $O((2b+1)^2)$ samples. The algorithm estimates M mod(2b+1) with $O(2b+1)^2$ repetitions of a quantum circuit of depth (2a+1) and, similarly, M mod(2a+1) with $O(2a+1)^2$ repetitions of a quantum circuit of depth (2b+1). The Chinese remainder theorem is then used to combine these low precision estimates to obtain the integer $M \in [0, (2a+1)(2b+1)]$, thus boosting the precision for the estimation procedure. The total number of oracle calls made was $O(ab^2+ba^2)=O(1/\epsilon^{1.5})$. The maximum depth for the oracle call was $O(1/\epsilon^{1/2})$. The procedure can be extended to the more general case where the true value for $\theta$ is $$\frac{\pi M}{2N}$$

where N is the product of $q \le K$ coprime moduli and $M \in [0, N]$. In this case, this disclosure also shows how to pick these values q, k. Here, the maximum depth of the quantum circuit is $D=O(1/\epsilon^{1-q/k})$, and the total number of oracle calls are $N=O(1/\epsilon^{1+q/k})$.

Additionally, the accuracy of the algorithm in the presence of depolarizing noise is considered. Specifically, this disclosure provides a number of graphs to show the behavior under noise. The analysis of the algorithm in a noisy setting shows that noise may limit the depth of the oracle calls that can be made, but it also allows us to choose (e.g., optimally) the algorithm parameters to reduce (e.g., minimize) the number of oracle calls for a given target approximation error and noise rate. The experiments show that the constant overhead for the QoPrime algorithm is reasonable (C<10) for most settings of interest (explained further below).

This disclosure also benchmarks the two new low depth amplitude estimation algorithms with a IQAE algorithm in noisy settings (Section 4.3). For reference, IQAE is described in D. Grinko, J. Gacon, C. Zoufal, and S. Woerner, "Iterative quantum amplitude estimation," arXiv preprint arXiv:1912.05559, 2019. Algorithms such as IQAE require access to a full circuit depth of $O(1/\epsilon)$, and this large depth is exponentially penalized by the depolarizing noise by requiring an exponentially large number of runs of the quantum circuit to achieve a precision below the noise level. In comparison, the power law and the QoPrime amplitude estimation algorithms transition smoothly to a classical estimation scaling and do not suffer from an exponential growth in oracle calls. The Power law amplitude estimation algorithm shows the best practical performance according to the simulations for different error rates and noise levels.

Overall, this disclosure presents two low depth algorithms for quantum amplitude estimation, thus potentially bringing a number of applications closer to the NISQ era. Specifically, the tradeoff between the total number of oracle calls and the depth of the quantum circuit that is offered by these algorithms may be a powerful tool towards finding quantum applications for near and intermediate term devices.

The disclosure is organized as follows: In Section 2, we describe and analyze the power law amplitude estimation algorithm, while in Section 3, we describe and analyze the QoPrime amplitude estimation algorithm. In Section 4, we present empirical evidence of the performance of our algorithm and benchmarks with other state-of-the-art algorithms for amplitude estimation.

2. Amplitude Estimation with Power Law Schedules 2.1 Preliminaries

In this section, we introduce some preliminaries for the analysis of amplitude estimation with power law schedules. Let X be a random variable with density function $f(X, \alpha)$ that is determined by the single unknown parameter α. Let l(X, α)=log $f$(X, α) be the log-density function and let $$l'(x, \alpha) = \frac{\partial l(x, \alpha)}{\partial \alpha}.$$

In this section, all expectations are with respect to the density function $f$(X, α) and ' denotes the partial derivative with respect to α.

The Fisher information $I_f(\alpha)$ is defined as the variance of the log-likelihood function, that is $I_f(\alpha)$=Var[l'(X, α)]. It can also be equivalently defined as $I_f(\alpha)$=−$E_f$[l"(X, α)]. More generally, for parameters α∈$\mathbb{R}^n$, the Fisher information is defined as the covariance matrix of the second partial derivatives of l(X, α) with respect to α.

Let α* be the true value for α and consider a Bayesian setting where a prior distribution on α is updated given i.i.d. (Independent and Identically Distributed Random Variables) samples $X_i$, i∈[n] from a distribution $f$(X, α*). The Bernstein-Von Mises theorem (stated below) quantifies the rate of convergence of the Bayesian estimator to the normal distribution with mean and variance $$\left(\alpha^*, \frac{1}{nI_f(\alpha^*)}\right)$$

in the $\ell_1$ norm for cases where the log-likelihood and the prior distribution are sufficiently regular. The complete list of regularity conditions for the theorem is given in Section 5.

Theorem 2.1 (Bernstein Von-Mises Theorem): Let $X_i$, i∈[n] be independent samples from a distribution $f$(X, α*) and let $R_0$ be the prior distribution on α. Let $R_n$ be the posterior distribution after n samples and let $Q_{n,\alpha^*}$ be the Gaussian with mean and variance $$\left(\alpha^*, \frac{1}{nI_f(\alpha^*)}\right).$$

If $f$(X, α*) and $R_0$ satisfy the regularity conditions enumerated in the Section 5, then there exists a constant c>0 such that, $$\Pr_{X_i \sim f, \, i \in [n]}\left[\|R_n - Q_{n,\alpha^*}\|_1 \geq c\sqrt{\frac{1}{n}}\right] = O\left(\frac{1}{\sqrt{n}}\right) \quad (1)$$

As we have defined before, the amplitude estimation algorithm has access to a quantum circuit U such that U|0$^t$⟩=cos(θ)|x, 0⟩+sin(θ)|x', 1⟩ where |x⟩ and |x'⟩ are arbitrary states on (t−1) qubits. If the second register is measured (e.g., in the standard basis), then the distribution of the measurement outcome $f$(X, α) may be a Bernoulli random variable with success probability α=cos²(θ)∈[0,1]. Thus, if the quantum computing system executes a circuit that includes k sequential calls to the circuit U, then the quantum state cos((2k+1)θ)|x, 0⟩+sin((2k+1)θ)|x', 1⟩ may be generated. In light of this, measuring this generated state (e.g., in the standard basis), the distribution of the measurement outcome may be a Bernoulli random variable with success probability cos²((2k+1)θ).

A quantum amplitude estimation algorithm therefore has access to samples from Bernoulli random variables with success probability cos²((2k+1)θ) where k is the number of sequential oracle calls in the quantum circuit, which corresponds to its depth. The higher depth samples (said differently, circuits with more sequential oracle calls) may be more informative for estimating θ. An example may help explain this: when we are sampling from a random variable with success probability cos²(3θ), with O(1/ϵ) samples we may get ϵ close to 3θ, which means we get ϵ/3 close to θ thus getting a better accuracy. The next proposition quantifies the advantage for higher depth samples, showing that the Fisher information may grow quadratically with the number of sequential oracle calls $m_k$.

Proposition 2.2: Let $f$(X, α)=$\beta^X(1-\beta)^{1-X}$ for parameter α=cos²(θ) and β=cos²((2$m_k$+1)θ) for a positive integer $m_k$. The Fisher information is $$I_f(\alpha) = \frac{(2m_k + 1)^2}{\alpha(1 - \alpha)}.$$

Proof: As α=cos²(θ) we have dα=2 cos(θ)sin(θ)dθ. The log-likelihood function is l(X, α)=X log β+(1−X)log(1−β). Thus, $$\begin{aligned}
I_f(\alpha) &= -E_f\left[\frac{d}{d\alpha^2}(2X\log\cos((2m_k+1)\theta) + 2(1-X)\log\sin((2m_k+1)\theta))\right] \\
&= \frac{-1}{2\alpha(1-\alpha)}E_f\left[\frac{d}{d\theta^2}\binom{X\log\cos((2m_k+1)\theta) +}{(1-X)\log\sin((2m_k+1)\theta)}\right] \\
&= \frac{(2m_k+1)^2}{2\alpha(1-\alpha)}\left(\frac{e_f[X]}{\cos^2((2m_k+1)\theta)} + \frac{E_f[1-X]}{\sin^2((2m_k+1)\theta)}\right) \\
&= \frac{(2m_k+1)^2}{2\alpha(1-\alpha)}.
\end{aligned}$$

The Fisher information is defined as a variance and is therefore additive over independent samples that do not need to be identically distributed. The Fisher information of an amplitude estimation schedule ($m_k$, $N_k$) is the sum of the Fisher informations for the individual samples. End of proof for Proposition 2.2.

2.2 The Power Law Amplitude Estimation Algorithm

An embodiment of the amplitude estimation algorithm using power law schedules is given as Algorithm 2.1 below. It is then analyzed to establish the tradeoff between the depth and the total number of oracle calls in a setting where the Bernstein Von Mises Theorem is applicable.

Algorithm 2.1 (the Power Law Amplitude Estimation Algorithm):

Goal: For a unitary gate U that performs U|0⟩=cos(θ)|x, 0⟩+sin(θ)|x', 1⟩ and for parameters β∈(0,1] and $N_{shot}$∈Z, estimate of θ within accuracy ϵ (e.g., with high probability).

Step 1: Initialize the prior to be a uniform distribution on angles $$\theta = \frac{\pi t \in}{2}.$$

Step 2: For k=1 to $$K = \max\left(\frac{1}{\epsilon^{2\beta}}, \log(1/\epsilon)\right)$$

do:
- a. Step 3: Initialize $N_{k_0}=0$ and $N_{k_1}=0$.
- b. Step 4: For i=1 to $N_{shots}$ do:
  - i. Step 5: Apply $$m_k = \lfloor k^{\frac{1-\beta}{2\beta}} \rfloor$$

sequential oracle calls and measure the last qubit of the resulting quantum state (e.g., in the standard basis).
  - ii. Step 6: If the outcome is 0, then $N_{k_0}=N_{k_0}+1$, else $N_{k_1}=N_{k_1}+1$.
- c. Step 7: end for.
- d. Step 8: Perform Bayesian updates $p(\theta) \to p(\theta)\cos((2m_k+1)\theta)^{N_{k_0}} \sin((2m_k+1)\theta)^{N_{k_1}}$ for $\theta=\pi t\epsilon/2$ for integer valued $t \in [0,1/\epsilon]$ and interpolate to obtain a posterior probability distribution.

Step 9: end for.
Step 10: Output $\theta$ with a (e.g., the highest) probability according to the posterior probability distribution.
End of Algorithm 2.1.

The next theorem (below) shows that Algorithm 2.1 achieves approximation error $\epsilon$ with parameters $$N = O\left(\frac{1}{\epsilon^{1+\beta}}\right) \text{ and } D = O\left(\frac{1}{\epsilon^{1-\beta}}\right),$$

where D is the maximum number of sequential oracle calls (also referred to as the maximum circuit depth) and N is the total number of oracle calls made. The choice of $$K = \max\left(\frac{1}{\epsilon^{2\beta}}, \log(1/\epsilon)\right)$$

results in the power law AE algorithm making at least $\log(1/\epsilon)$ oracle calls for small and approaches the exponential schedule $m_k=2^k$ if $\beta \to 0$.

Theorem 2.3: the power law amplitude estimation algorithm 2.1 outputs an $\epsilon$ accurate estimate with $$N = O\left(\frac{1}{\epsilon^{1+\beta}}\right)$$

oracle calls and maximum circuit depth $$D = O\left(\frac{1}{\epsilon^{1-\beta}}\right)$$

with probability at least 0.9, that is the algorithm attains the tradeoff $$ND = O\left(\frac{1}{\epsilon^2}\right)$$

in settings where the Bernstein-Von Mises theorem is applicable.

Proof: The total number of oracle calls for Algorithm 2.1 is $N=\Sigma_{k \in [K]} N_{shot}(2m_k+1)$ while the Fisher information for the power law schedule can be computed as $$I_f(\alpha) = \frac{N_{shot}}{\alpha(1-\alpha)} \Sigma_{k \in [K]}(2m_k+1)^2$$

using proposition 2.2. Approximating the sums in N and $I_f(\alpha)$ by the corresponding integrals (where we replace the sum in the definition with an integral) gives $I_f(\alpha)=O(K^{1/\beta})$, $N=O(K^{(1+\beta)/2\beta})$ and maximum depth $D=O(K^{(1-\beta)/2\beta})$, so that $I_f(\alpha)=O(ND)$. Note that for $$K = \max\left(\frac{1}{\epsilon^{2\beta}}, \log(1/\epsilon)\right),$$

we nay $$N = O\left(\frac{1}{\epsilon^{1+\beta}}\right) \text{ and } D = O\left(\frac{1}{\epsilon^{1-\beta}}\right) \text{ and } I_f(\alpha) = O\left(\frac{1}{\epsilon^2}\right).$$

Next, we show that with probability at least 0.9, the estimate output by the algorithm is within additive error E of the true value. Applying the Bernstein Von-Mises Theorem, the $\ell_1$ distance between the posterior distribution and the Gaussian with mean and variance $(\alpha^*, 1/\sqrt{N_{shot}I_f(\alpha^*)})$ is at most $c/\sqrt{N_{shot}}$ with probability at least $1-c'/\sqrt{N_{shot}}$ for some constants c, c'>0.

Choosing $$N_{shot} > \left(\frac{\max(c, c')}{\delta}\right)^2$$

for $\delta=0.05$, the estimate is within $$\left(\alpha^* \pm \frac{3\delta}{c\sqrt{I_f(\alpha^*)}}\right)$$

with probability at least $1-\delta(1+1)-0.0013 \geq 0.89$. The success probability can be boosted to $$1 - \frac{1}{poly(\zeta)}$$

for $\zeta>0$ by running the power law algorithm $O(\log(1/\zeta))$ times and outputting the most frequent estimate.

The above proof analyzes Algorithm 2.1 in settings where the Bernstein Von Mises theorem is applicable. The complete list of regularity conditions for the theorem are enumerated in Section 5. In high level, for some neighborhood around the real value of $\theta$ the regularity conditions impose: the smoothness of the prior distribution; the smoothness of the density function $f(X, \theta)$, which will be satisfied if the norm of log-likelihood is bounded around $\theta$; and the smoothness and differentiability of the Fisher information around θ, which will be true if the log-likelihood function has derivatives of order at least 3.

Figure 1:
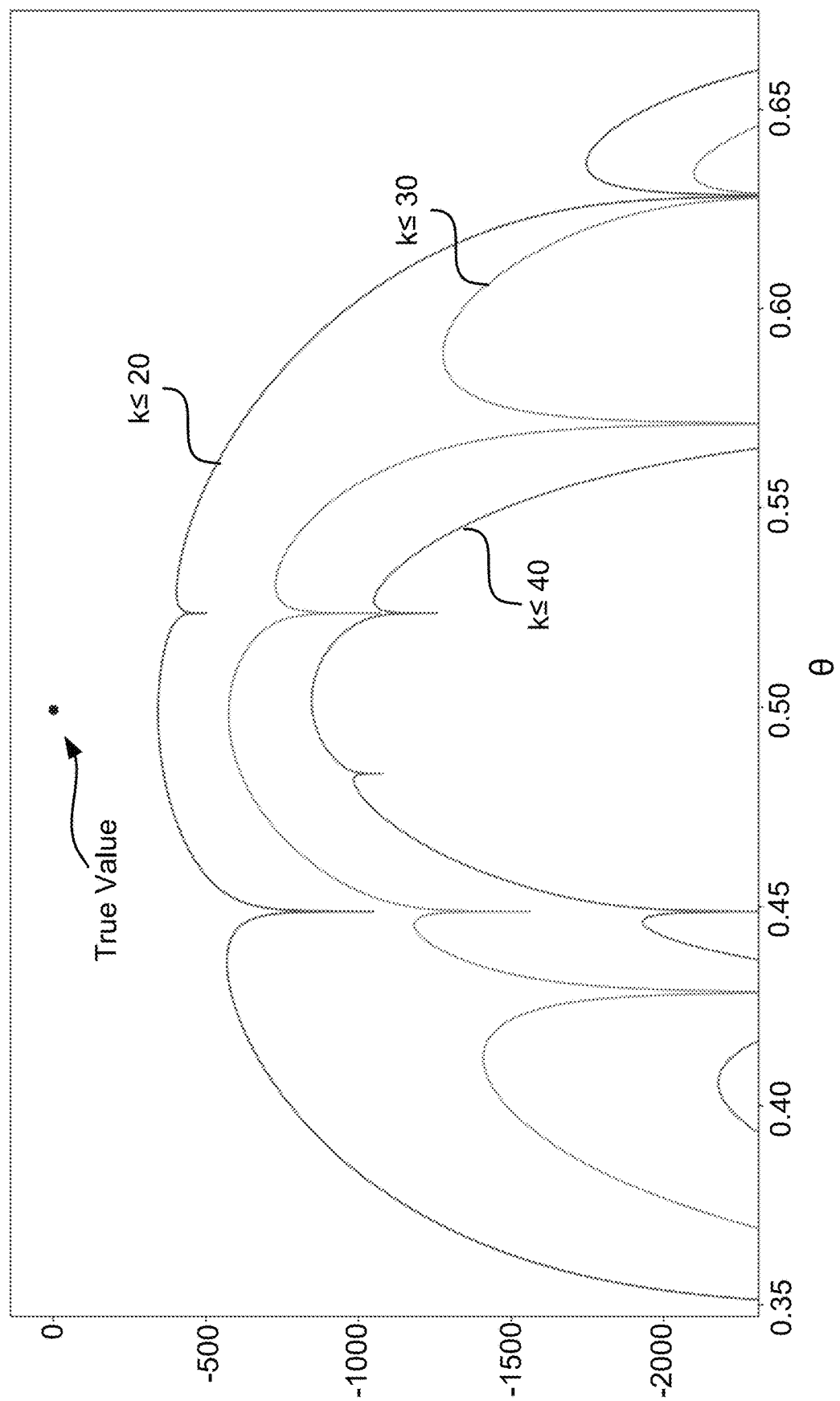
FIG. 1 plots a log-likelihood function for a power law amplitude estimation algorithm.

FIG. 1 plots the log-likelihood function for the power law AE algorithm for a fixed exponent β and varying depths (k) and a true value for θ chosen uniformly at random from [0, π/2]. The figure illustrates that the log-likelihood function is smooth in a neighborhood around the true value of θ indicating that the regularity conditions for the Bernstein-Von Mises theorem may be plausible in this setting. Adding noise may further regularize the log-likelihood functions and enforce the regularity conditions for the Bernstein-Von Mises theorem.

The constants c, c' in the proof of Theorem 2.3 may be determined explicitly if the regularity conditions are verified giving an explicit value for $N_{shot}$. In the absence of an explicit value, if experimental results demonstrate convergence for a small value of $N_{shot}$, may be taken as evidence that $N_{shot}$ is a moderately small constant.

2.3 Power Law Amplitude Estimation with Noise

Noise provides a natural constraint on accessible circuit depths and noise models exponentially penalize larger depths, leading to an exponential decoherence of quantum states. Therefore, exponentially more classical samples may be needed to battle the noisy information (depending on the algorithm). In this section, we explain this effect on the power law algorithm in the case of a depolarizing noise model.

Proposition 2.4: Assuming a depolarizing noise channel with a per-oracle-call rate of γ≥0, if measurements (e.g., in the standard basis) are performed on a quantum circuit of k sequential calls to the oracle U, the distribution of measurement outcomes is a Bernoulli random variable with success probability $$p = \frac{1}{2} - \frac{1}{2}e^{-\gamma k}\cos(2(2k+1)\theta). \quad (2)$$

Let $\{m_k\}_{k=0,\ldots,K}$ be a schedule. The Fisher information in the presence of depolarizing noise with parameter γ is given by $$I_f(\alpha) = \frac{N_{shot}}{\sin^2(2\theta)}\sum_{k=0}^{K}(2m_k+1)^2\frac{4e^{-2\gamma m_k}\sin^2(2(2m_k+1)\theta)}{1-e^{-2\gamma m_k}\cos^2(2(2m_k+1)\theta)}. \quad (3)$$

For more information, see T. Tanaka, Y. Suzuki, S. Uno, R. Raymond, T. Onodera, and N. Yamamoto, "Amplitude estimation via maximum likelihood on noisy quantum computer," arXiv preprint arXiv:2006.16223, 2020. Recall that $\alpha=\cos^2(\theta)$ is the probability of success without depolarizing noise. For k such that $\gamma m_k$ becomes big enough so the term $e^{-2\gamma m_k}$ becomes very close to zero, the second term in the sum will be exponentially suppressed. Thus, the Fisher information will not increase significantly even if the circuit depth increases (said differently, if the number of sequential oracle calls increases).

Consider the power law schedule given by $m_k = \lfloor k \rfloor$ for k=0, 1, . . . , K for $$\eta = \frac{1-\beta}{2\beta}$$

and β∈(0,1], as described in Algorithm 2.1. We see that $$I_f(\alpha) \leq \sum_{\gamma\lfloor k^\wedge \eta\rfloor \leq 1}(2\lfloor k^\wedge \eta\rfloor+1)^2 C + \text{exponentially suppressed}$$

$$\text{terms} \leq 10C\sum_{k=0}^{(1/\gamma)^{1/\eta}}(2k^\eta+1)^2 \leq C'/\gamma^{2+1/\eta} = C'/\gamma^{2/(1-\beta)}.$$

Here C is a constant that can be taken to be $$C := \frac{4N_{shot}}{\sin^4(2\theta)}$$

(if this diverges, add small random noise to θ). So, by the Cramer-Rao bound, $$I_f(\alpha) \leq \frac{c'}{\gamma^{2/(1-\beta)}} \Rightarrow \epsilon \geq c\gamma^{1/(1-\beta)}, \quad (4)$$

where $c:=C'^{-1/2}$. This implies that given a noise level γ we cannot get an error rate ϵ smaller than $c\gamma^{1/(1-\beta)}$ by increasing the depth for a power law schedule with a fixed parameter β. Said differently, given a desired error rate ϵ and a noise level γ, we can determine the parameter β to match the lower bound in equation 4. In this case, it is assumed that the regularity conditions of Bernstein-von Mises also hold in the noisy setting so that the lower bound can be matched on ϵ.

If the noise level is smaller than the desired error rate, then the exponential schedule (for β equal to 0) may be used since circuits of depth up to O(1/ϵ) may be applied. For ϵ<γ, we assume that we can match the lower bound in equation 4 so that β can be determined as follows.

Proposition 2.5: Assume a target error E and noise level γ with 0<ϵ<γ<1 and that the regularity conditions of the Bernstein-von Mises hold in the noisy setting. The parameter β of the power law algorithm may be determined according to $$\beta \geq 1 - \frac{\log\gamma}{\log\epsilon/c}$$

to achieve $\epsilon \leq c\gamma^{1/(1-\beta)}$ for the power law schedule $m_k=\lfloor k^\eta \rfloor$ for k=0, 1, . . . , K with parameter $$\eta = \frac{1-\beta}{2\beta}$$

(with high probability over the randomness of the algorithm as previously discussed).

3. QoPrime: A Number Theoretic Amplitude Estimation Algorithm 3.1 Preliminaries

This section introduces technical tools used for the QoPrime AE algorithm. In particular, this section describes the Chinese remainder theorem and the additive form of the Chernoff bounds.

Theorem 3.1 (The Chinese Remainder Theorem): Let $a_i \in \mathbb{N}$, $i \in [0, k]$ be pairwise coprime numbers such that for all $i \neq j$, $\gcd(a_i, a_j) = 1$ and let $N = \Pi_{i \in [k]} a_i$. Then for all $b_i \in [a_i], i \in [k]$ there is a polynomial time algorithm to find $M \in [N]$ such that M mod $a_i = b_i$.

Proof: First describe the proof for k=2. By applying the extended Euclidean algorithm, we can find $u_1, u_2 \in \mathbb{Z}$ such that, $$1 = \gcd(a_1, a_2) = u_1 a_1 + u_2 a_2, \quad (5)$$

Then $M = (b_2 u_1 a_1 + b_1 u_2 a_2) \bmod a_1 a_2$ satisfies $M = b_i \bmod a_i$ for i=1,2.

For the proof of the general case, note that the k−1 numbers $a_1, a_2, a_3, a_4, \ldots, a_k$ are coprime and, by the above argument, the constraints $M = b_i \bmod a_i$ for i=1,2 is equivalent to $M = (b_2 u_1 a_1 + b_1 u_2 a_2) \bmod a_1 a_2$. The procedure may therefore be repeated iteratively to find the desired M. End of proof for Theorem 3.1.

The QoPrime algorithms in this disclosure use relatively coprime moduli $a_i$, however the results may be adapted to a setting where the $a_i$ are not pairwise coprime. For example, this may be done by replacing $N = \Pi_{i \in [k]} a_1$ with the least common multiple of the $a_i$.

Another tool used for the QoPrime algorithm is the additive form of the Chernoff bound and some supplementary calculations on the entropy of the binomial distribution.

Theorem 3.2 (Chernoff-Hoeffding Bound): Let $X_i$ for $i \in [m]$ be i.i.d. random variables such that $X_i \in \{0,1\}$ with expectation $\mathbb{E}[X_i] = p$ and let $\epsilon > 0$ and $$X = \frac{1}{m} \sum_{i \in [m]} X_i.$$

Then,

1. $Pr[X > p + \epsilon] \leq e^{-D(p+\epsilon \| p)m}$ and

2. $Pr[X < p - \epsilon] \leq e^{-D(p-\epsilon \| P)m}$, where the relative entropy $D(x\|y) = x \ln$ $$\frac{x}{y} + (1-x)$$

ln $$\frac{(1-x)}{(1-y)}$$

and the relative entropy can be lower bounded using the inequality $$D(x\|y) \geq \frac{(x-y)^2}{2\max(x, y)}$$

for all x, y $\in [0,1]$.

The lower bound on the relative entropy may be used to make the Chernoff bounds effective.

Next, we derive a corollary may be useful for the analysis of the QoPrime algorithm.

Corollary 3.3: The following lower bound holds for the relative entropy for all x, y $\in [0,1]$, $$D(x\|y) \geq \frac{(x-y)^2}{2\max(1-x, 1-y)}.$$

Proof: the relative entropy is symmetric under the substitution $(x, y) \to (1-x, 1-y)$, that is $D(x\|y) = D((1-x)\|(1-y))$. The result follows by applying the inequality $$D(x\|y) \geq \frac{(x-y)^2}{2\max(x, y)}$$

for (x', y') = (1-x, 1-y). End of proof.

This disclosure also provides the Multiplicative Chernoff bounds which may be used to compute one or more constants in the QoPrime algorithm.

Theorem 3.4 (Multiplicative Chernoff Bounds): Let $X_i$ for $i \in [m]$ be independent random variables such that $X_i \in [0,1]$ and let $X = \Sigma_{i \in [m]} X_i$. Then, $Pr[|X - \mathbb{E}[X]| \geq \beta \mathbb{E}[X]] \leq e^{-\beta^2 \mathbb{E}[X]/3}$ for $0 < \beta < 1$.

3.2 The QoPrime AE Algorithm

An embodiment of the QoPrime AE algorithm is presented as Algorithm 3.1. The implementation of the steps of the algorithm is described in greater detail below and the algorithm is analyzed to establish correctness and bound the running time.

Recall that an amplitude estimation algorithm has access to a quantum circuit U such that $U|0^t\rangle = \cos(\theta)|x, 0\rangle + \sin(\theta)|x', 1\rangle$ where $|x\rangle$ and $|x'\rangle$ are arbitrary states on (t−1) qubits. Let $R_0$ be the reflection in $|0^t\rangle$ that is $R_0|0^t\rangle = |0^t\rangle$ and $R_0|0^\perp\rangle = -|0^\perp\rangle$ (where $|0^\perp\rangle$ is any state orthogonal to the $|0^t\rangle$ state), and let $S_0$ be the reflection on $|0\rangle$ in the second register, that is $S_0|x, 0\rangle = |x, 0\rangle$ and $S_0|x, 1\rangle = -|x, 1\rangle$ for all $|x\rangle$. The QoPrime algorithm uses (2k+1) sequential applications of the circuit for U to create the states, $$|\phi_k\rangle := (UR_0 U^{-1} S_0)^k U|0\rangle = \cos((2k+1)\theta)|x, 0\rangle + \sin((2k+1)\theta)|x', 1\rangle. \quad (6)$$

As previously described, an oracle call is a single application (e.g., execution) of the circuit U on a quantum computing system, the total number of oracle calls (N) is a measure of the running time on the quantum computing system of the amplitude estimation algorithm. Also, the maximum circuit depth (D) is the largest number of sequential calls to U in a single run of the quantum computing system. As stated above, (2k+1) sequential oracle calls creates a copy of the quantum state $|\phi_k\rangle$.

Some embodiments of the QoPrime algorithm are parametrized by integers (k, q) where $k \geq 2$ and $1 \leq q \leq (k-1)$. The parameter k is the number of moduli used for the reconstruction procedure and q determines the number of moduli that are grouped together. The algorithm includes determining coprime moduli $(n_1, n_2, \ldots, n_k)$ where each modulus is an integer close to $\lfloor 1/\epsilon^{1/k} \rfloor$. Let $$\theta = \frac{\pi M}{2N}$$

be the true value of θ for $M=\lfloor M \rfloor+\{M\}$ where $M \in [0, N]$ and $N=\Pi_{i \in [k]} n_i$. The algorithm includes partitioning the set of the k moduli into groups, $\pi_i$, of size at most q. Let $N_i=\Pi_{j \in \pi_i} n_j$ for $i \in \lceil k/q \rceil$ be the product of the moduli in each group.

Some embodiments of the QoPrime algorithm reconstruct estimates $\overline{M_i}$ that are within a (e.g., 0.5) confidence interval around $M \mod N_i$ with high probability. These estimates may be constructed using $N/N_i$ sequential calls to U to prepare the quantum states described by equation 6. Afterwards, the quantum state may be measured (e.g., in the standard basis). These low-precision estimates $\overline{M_i}$ may be combined using the Chinese remainder theorem to determine an ϵ accurate estimation for $$\theta = \frac{\pi M}{2N}.$$

Some embodiments of the QoPrime algorithm use $O(1/\epsilon^{1-q/k})$ sequential calls to U and a total of $O(1/\epsilon^{1+q/k})$ oracle calls for estimating θ within accuracy ϵ. Similar to the power law algorithm, it trades off the maximum circuit depth against the total number of oracle calls.

Algorithm 3.1 (QoPrime Algorithm for Amplitude Estimation):

Goal: for a unitary gate U that performs $U|0^t\rangle = \cos(\theta)|x, 0\rangle + \sin(\theta)|x', 1\rangle$ and for parameters (k, q), where $k \geq 2$ is the number of moduli and $1 \leq q \leq (k-1)$, estimate of θ within accuracy ϵ with success probability at least p, where $1-2ke^{-2c} > p$ for constant c.

Step 1: Select coprime odd moduli $(n_1, n_2, \ldots, n_k)$ close to $\lfloor 1/\epsilon^{1/k} \rfloor$, let $N=\Pi_{i \in [k]} n_i$, and ensure that $N \geq \pi/\epsilon$.

Step 2: Partition [k] into $\lceil k/q \rceil$ groups $\pi_i$ of size at most q and let $N_i=\Pi_{j \in \pi_i} n_j$.

Step 3: If $q/k \geq \frac{1}{3}$ then:

a. Step 4: Use at most $$\frac{24c}{\epsilon^{1+q/k}}$$

depth 0 samples (a depth 0 sample is sampling directly from the oracle) to obtain an additive error $$\frac{1}{2\epsilon^{(1-q/k)}}$$

estimate for θ with probability at least $1-e^{-2c}$.

Step 5: Else:

a. Step 6: Invoke the QoPrime algorithm recursively with accuracy $$\epsilon' = O(1/\epsilon^{1-q/k}) \text{ and } q'/k' \text{ such that } 1+q/k < 1+q'/k' < \frac{(1+q/k)}{(1-q/k)} \text{ to}$$

obtain an additive error estimate for θ.

Step 7: End if.

Step 8: For i=1 to $\lceil k/q \rceil$ do:

a. Step 9: Prepare $100 \, cN_i^2$ copies of the quantum state $|\phi_{(N-N_i)/2N_i}\rangle$ (see equation 6) and measure (e.g., in the standard basis) for each quantum state.

b. Step 10: Compute $$\hat{l} = \frac{2N_i}{\pi} \arccos(\sqrt{\hat{p}})$$

where $\hat{p}$ is the observed probability of outcome 0 of a predetermined qubit.

c. Step 11: Define $$\theta = \frac{\pi M}{2N}$$

for $M=tN_i+l$. Then determine t from the additive error $N/2N_i$ estimate computed in steps 4-8 of the algorithm.

d. Step 12: Compute $\overline{M_i}=(-1)^t \hat{l} \mod N_i$, where $\overline{M_i}$ is an estimate of M.

Step 13: end for.

Step 14: Define α to be the number in the interval $I = \cap_i ([\overline{M_i}-0.25, \overline{M_i}+0.25] \mod 1)$.

Step 15: Compute $M_i=\lfloor \overline{M_i}+\beta_i \rfloor$ where $\beta_i \in [-0.25, 0.25]$ is such that $\{\overline{M_i}+\beta_i\}=\alpha$.

Step 16: Reconstruct $\overline{M} \mod N$ applying the Chinese Remainder Theorem to the computed $M_i$ values.

Step 17: Determine $$\frac{\pi(\overline{M} + \alpha)}{2N}$$

as estimate for θ.

End of algorithm 3.1.

The procedures used in steps 4-12 of the QoPrime Algorithm 3.1 are described next and correctness proofs are provided for each step. Let $M=tN_i+l$ for some $t \in \mathbb{Z}$ and $0 \leq l \leq N_i$. Note that $l=M \mod N_i$ is the value being estimated in step 5 of the QoPrime algorithm.

Step 9 of the QoPrime algorithm 3.1 samples from a Bernoulli random variable with success probability $$p = \cos^2\left(\frac{(tN_i+l)\pi}{2N_i}\right).$$

Step 10 computes an estimate $$\hat{l} = \frac{2N_i}{\pi} \arccos(\sqrt{\hat{p}})$$

where $\hat{p}$ is the observed probability of outcome 0. The analysis below shows that $|\hat{l}-(-1)^t l \mod N_i| \leq 0.25$ with high probability.

We begin with the observation that if $p=\hat{p}$ then $\hat{l}=(-1)^t l \mod N_i$ (p represents the real value and $=\hat{p}$ represents the observed value).

$$\frac{2N_i}{\pi} \arccos(\sqrt{p}) = \qquad (7)$$

-continued $$\begin{cases} \frac{2N_i}{\pi}\arccos\left(\cos\left(\frac{l\pi}{2N_i}\right)\right), & \text{if } t = 0 \mod 2 \\ \frac{2N_i}{\pi}\arccos\left(\sin\left(\frac{l\pi}{2N_i}\right)\right), & \text{if } t = 1 \mod 2 \end{cases} = (-1)^t l \mod N_i.$$

If $$\theta = \frac{\pi M}{2N}$$

for $M = tN_i + 1$, then the estimator in step 10 estimates $(-1)^t l \mod N_i$ as shown in Lemma 3.6 (below). The Chinese remainder theorem based reconstruction procedure (step 16) however uses (e.g., requires) $l \mod N_i$ for all $N_i$ making it useful (e.g., necessary) to determine the value of $t \mod 2$. In steps 3-7 of the algorithm, an additive error $N_i/2$ for estimate $M = tN_i + 1$ is determined by recursively using the QoPrime algorithm. The value of $t$ is then determined in step 11 by rounding the estimate to the closest integer of the form $tN_i + N_i/2$ for $0 \le t < N/N_i$. The next lemma establishes the correctness of this recursive procedure.

Lemma 3.5: The recursive procedure in steps 3-7 of the QoPrime algorithm terminates in at most $O(\log k)$ iterations and outputs an additive error $N_i/2N$ estimate for $\theta$ with probability at least $1 - 9e^{-2c}$.

Proof: First we establish the correctness of the stopping condition in step 4. If $q/k \ge \frac{1}{3}$, then $$\frac{(1 + q/k)}{2} \ge (1 - q/k).$$

Thus, by the multiplicative Chernoff bounds, an additive error $$\frac{1}{2\epsilon^{(1-q/k)}}$$

estimate for $\theta$ is obtained with $$\frac{24c}{\epsilon^{(1+q/k)}}$$

depth 0 samples with probability at least $1 - e^{-2c}$ for a constant $c > 0$.

Next, we show that the recursion terminates in at most $O(\log k)$ steps and that the total number of oracle calls used in the recursive step is upper bounded by $O(1/\epsilon^{1+q/k})$.

The recursive call to the QoPrime algorithm in step 6 uses $O(1/\epsilon^{1 \cdot (1+q'/k')}) = O(1/\epsilon^{(1-q/k)(1+q'/k')})$ total oracle calls. As $(1-q/k)(1+q'/k') < (1+q/k)$ the total number of oracle calls used by steps 3-7 may be at most $O(1/\epsilon^{1+q/k})$. The extra oracle calls used for these steps may not change the asymptotic number of oracle calls used by the QoPrime algorithm. Further, because $1+q/k < 1+2q/k < (1+q/k)/(1-q/k)$ it is possible to choose $q' = 2q$, $k' = k$ and with this choice the stopping condition $q/k \ge \frac{1}{3}$ in step 4 will hold after a number of iterations (e.g., at most $O(\log k)$ iterations).

The success probability for these steps is similar to (e.g., the same as) the success probability for the final recursive call to the Qo-prime algorithm in step 6, which uses at most $\lceil k/q \rceil \le 3$ moduli by the stopping condition. For this final recursive call, the signs are determined correctly with probability at least $1 - 3e^{-2c}$ for the union bound. Further, the argument in Theorem 3.7 shows that the QoPrime algorithm succeeds with probability at least $1 - 6e^{-2c}$ in a setting where the t have been determined correctly and there is at most 3 moduli, implying that the steps 3-7 succeed with probability at least $1 - 9e^{-2c}$. End of proof for Lemma 3.5.

The following Lemma quantifies the error possibly made in approximating $(-1)^t l \mod N_i$ using the Chernoff bounds to bound the difference between $\hat{p}$ and $p$.

Lemma 3.6: Given $m = 100 \, cN^2$ samples for modulus N, steps 9-10 of the QoPrime algorithm finds an estimate such that $|\hat{l} - (-1)^t l \mod N_i| \le 0.25$ with probability at least $1 - 2e^{-2c}$.

Proof: Define F: $[0,1] \to [0, N]$ as $$F(p) = \frac{2N}{\pi} \arccos(\sqrt{p})$$

so that $F(p) = (-1)^t l \mod N$ by equation 7 and $F(\hat{p}) = \hat{l}$. It is sufficient to show that $\Pr[|F(p) - F(\hat{p})| \ge 0.25] \le e^{-2c}$ for all $p \in [0,1]$.

The inverse function G: $[0, N] \to [0,1]$ such that $$G(y) = \cos^2\left(\frac{\pi y}{2N}\right)$$

is monotonically decreasing. Let $F(p) = y$, then $F(p) - F(\hat{p}) \ge 0.25$ is equivalent to $(y - 0.25) \ge F(\hat{p})$, that is $G(y - 0.25) \le \hat{p}$. Applying the additive Chernoff bound results in $$\Pr[\hat{p} > G(y - 0.25)] \le e^{-mD(G(y-0.25)\|G(y))}. \quad (8)$$

The analysis splits into two cases, where the relative entropy is lower bounded using either the inequality in Theorem 3.2 or Corollary 3.3. Let $$A = \frac{\pi y}{2N}$$

and $$B = \frac{\pi(y - 0.25)}{2N}.$$

First consider the case $y > N/2$ or equivalently $A > \pi/4$, $$mD(G(y-0.25)\|G(y)) \ge m\frac{(\cos^2(A) - \cos^2(B))^2}{2\cos^2(B)} = \quad (9)$$

$$m\frac{(\cos^2(2A) - \cos^2(2B))^2}{8\cos^2(B)} = m\frac{\sin^2(A+B)\sin^2(A-B)}{2\cos^2(B)} =$$

$$m\frac{\sin^2(A-B)}{2}(\sin(A) + \cos(A)\tan(B))^2 \ge$$

$$50cN^2 \sin^2\left(\frac{\pi}{8N}\right) \ge 50cN^2 \frac{\pi^2}{128N^2} > 2c.$$

Note that for the last two steps in the computation, the inequality $(\sin(A) + \cos(A)\tan(B))^2 > 1$ for $A > \pi/4$ and $$A - B = \frac{\pi}{8N}$$

is used along with the lower bound $\sin(x) \geq x/2$ for $x \in [0, \pi/2]$.

For the case $y < N/2$ a similar computation is performed using Corollary 3.3 to lower bound the relative entropy, $$mD(G(y-0.25)\|G(y)) \geq m\frac{(\cos^2(A) - \cos^2(B))^2}{2\cos^2(B)} = \qquad(10)$$

$$m\frac{\sin^2(A+B)\sin^2(A-B)}{2\cos^2(B)} =$$

$$m\frac{\sin^2(A-B)}{2}(\cos(B) + \sin(B)\cot(A))^2 \geq 50cN^2\sin^2\left(\frac{\pi}{8N}\right) > 2c.$$

For the last steps in the computation, the inequality $(\cos(B)+\sin(B)\cot(A))^2 > 1$ for $A < \pi/4$ and $$A - B = \frac{\pi}{8N}$$

was used along with the lower bound $\sin(x) > x/2$ for $x \in [0, \pi/2]$.

Similarly, $F(\hat{p}) - F(p) \geq 0.25$ is equivalent to $G(y+0.25) > \hat{p}$ and the probability can be bounded using the additive Chernoff bound, $$Pr[\hat{p} < G(y+0.25)] \leq e^{-mD(G(y+0.25)\|G(y))}. \qquad(11)$$

Further, $mD(G(y+0.25)\|G(y)) \geq 2c$ for all $y \in [0, N]$ with probability at least $1 - e^{-2c}$. This follows from calculations similar to the ones in equations 9 and 10 with denominators $(\cos^2(B), \sin^2(A))$ replaced by $(\cos^2(A), \sin^2(B))$. From the union bound in probability theory, it follows that $|\hat{I} - (-1)^t I \mod N| \leq 0.25$ with probability at least $1 - 2e^{-2c}$. End of proof for Lemma 3.6.

The procedure in steps 14-16 of the QoPrime algorithm 3.1 is now described for estimating the values $M_i$ that are later used in the Chinese Remainder theorem. Define the confidence intervals $A_i = [\{\overline{M_i}\} - 0.25, \{\overline{M_i}\} + 0.25]$ corresponding to the estimates $\{\overline{M_i}\}$ produced by the QoPrime algorithm. Let $I = \cap_i A_i$ be the intersection of the $A_i$. Applying the union bound and Lemma 3.6 it follows that $I$ is non empty and the fractional part $\{M\} \in I$ with probability at least $1 - 2ke^{-c}$. Step 14 of the QoPrime algorithm is therefore able to determine $\alpha \in I$. In Step 15, from $\alpha$, $\beta_i \in [-0.25, 0.25]$ is determined such that $\{\overline{M_i} + \beta_i\} = \alpha$ and then the value $M_i$ is computed as $M_i = \lfloor \overline{M_i} + \beta_i \rfloor$. Next, we show that using the Chinese Remainder Theorem on these values produces an estimate with error E with high probability.

Theorem 3.7: The estimate output by the QoPrime algorithm is within additive error $\epsilon$ of the true value with probability at least $1 - 11ke^{-2c}$.

Proof: For $m_i \in \mathbb{Z}/\mathbb{Z}_{N_i}$, let $CRT(m_1, \ldots, m_k)$ denote the unique integer $m$ mod $N$ such that $m = m_i$ mod $N_i$ (note that CRT stands for Chinese Remainder Theorem). The Chinese remainder theorem shows that this function is invertible, specifically $CRT^{-1}(m) = (m \bmod n_1, \ldots, m \bmod n_k)$. The CRT function is continuous in the following sense $CRT^{-1}(m+a) = (m+a \bmod n_1, \ldots, m+a \bmod n_k)$, or equivalently $CRT(m_1+a, m_2+a, \ldots, m_k+a) = CRT(m_1, \ldots, m_k) + a$ for $a \in \mathbb{Z}$. For $M = \lfloor M \rfloor + \{M\}$, we have $$M = CRT(\lfloor M \rfloor \bmod N_1, \ldots, \lfloor M \rfloor \bmod N_{\lceil k/q \rceil}) + \{M\}. \qquad(12)$$

The QoPrime algorithm instead outputs the reconstructed estimate, $$\overline{M} = CRT(\lfloor \overline{M_1} + \beta_1 \rfloor, \ldots, \lfloor \overline{M_{\lceil k/q \rceil}} + \beta_i \rfloor) + \alpha. \qquad(13)$$

Assuming that the t were determined correctly, by Lemma 3.6 and the choice of $\beta_i$ in step 15 of the QoPrime Algorithm, $|\overline{M_i} + \beta_i - (\lfloor M \rfloor \bmod N_i + \{M\})| = \gamma < 0.5$ for all i where $\gamma$ is independent of i with probability at least $1 - 2ke^{-2c}$. This statement suffices for the analysis in Lemma 3.5, which in turn shows that the t are indeed determined correctly with probability $1 - 9e^{-2c}$. The probability for the moduli and estimates to be correct is $1 - 11ke^{-2c}$ by the union bound.

The accuracy of the estimates for the moduli implies that $|\lfloor \overline{M_i} + \beta_i \rfloor - (\lfloor M \rfloor \bmod N_i)| \leq 1$. By continuity of the Chinese remainder theorem, the reconstruction error $|\overline{M} - M| \leq 1 + |\alpha - \{M\}| \leq 1.5$. The QoPrime algorithm therefore outputs an estimate $$\frac{\pi \overline{M}}{2N}$$

that differs from the true value $$\frac{\pi M}{2N}$$

by at most $$\frac{\pi}{N} \leq \epsilon.$$

End of proof for Theorem 3.7.

3.3 Choosing the Parameters

In this section, we further detail determining the parameters for the QoPrime algorithm. The small-$\epsilon$ asymptotics of the QoPrime algorithm are based on selecting coprime moduli of similar magnitude and product of order $\Theta(\epsilon^{-1})$. To this effect, we formulate the following lemma:

Lemma 3.8: Given a fixed integer $k \geq 2$ and $N \in \mathbb{R}$, we can find k mutually coprime integers $n_1(N) < n_2(N) < \ldots < n_k(N)$ such that $$\lim_{N \to \infty} \frac{n_1(N) \ldots n_k(N)}{N} = 1$$

and $$\lim_{N \to \infty} \frac{n_k(N)}{n_1(N)} = 1.$$

Figure 2:
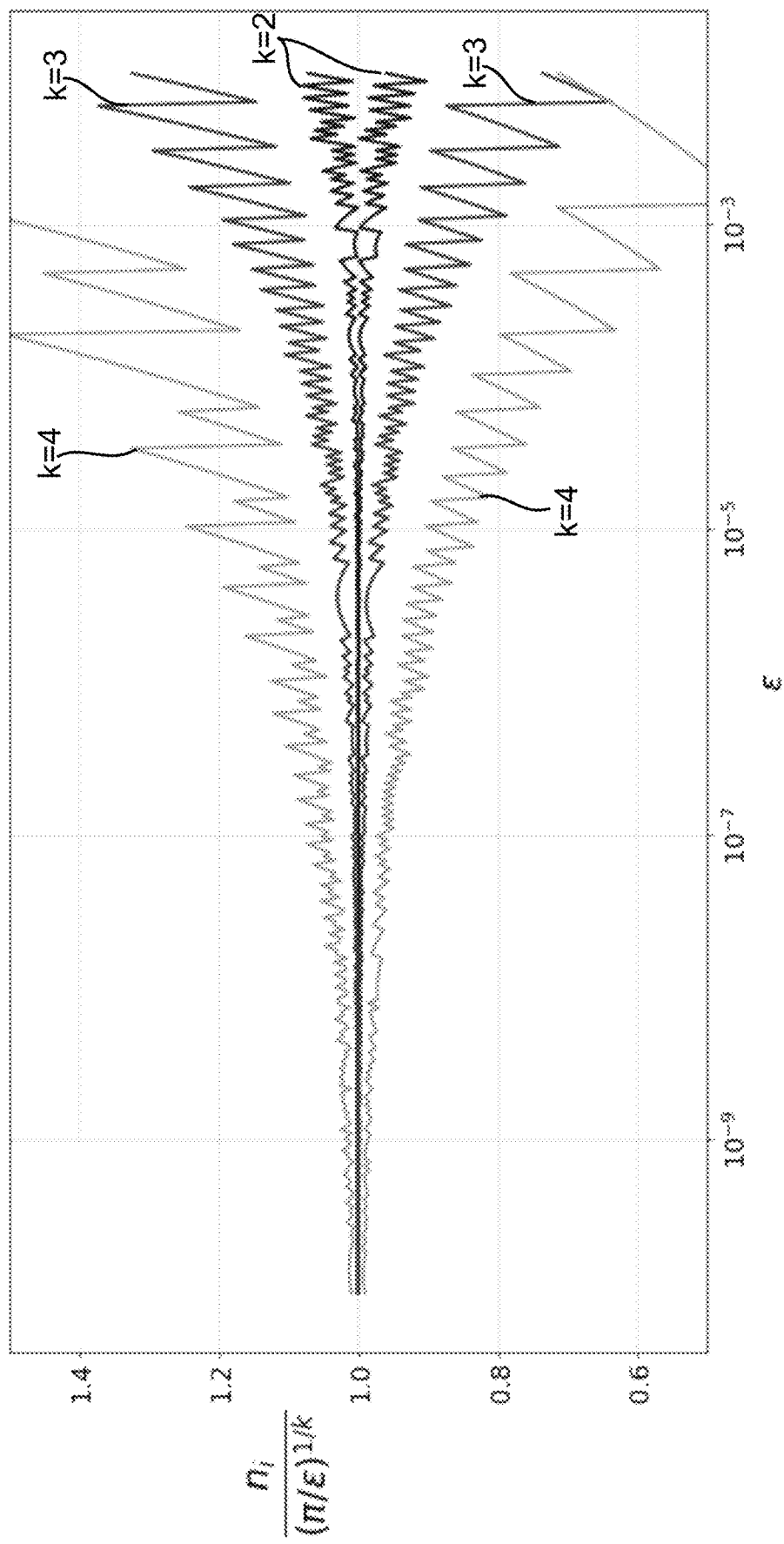
FIG. 2 illustrates a plot of the convergence of a coprime finding routine.

This lemma follows from the sub-linear scaling of the number of coprimes that can fit inside an interval of a given size. In practice, a table of k adjacent odd coprimes may be pre-computed. The computed k adjacent odd coprimes start at each odd integer, stop at large enough values of k and $n_1$ according to the target precision $\epsilon$. It suffices to build the table for $k \leq 12$ and $n_1 \approx 10^5$ to achieve approximation error $\epsilon = 10^{-10}$, both with and without noise. Given the table, target precision $\epsilon$, and an integer $k \geq 2$, the implementation chooses k adjacent coprimes from the table starting at $\lfloor \epsilon^{1/k} \rfloor$ with product closest to $$\frac{\pi}{\epsilon}$$

in absolute value. FIG. 2 compares the table used in practice to the theoretical guarantees in Lemma 3.8.

Specifically, FIG. 2 illustrates a plot of the convergence of the coprime finding routine described above. The output of the routine is k adjacent coprimes $n_1, n_2, \ldots, n_k$ such that their product $N = n_1 \ldots n_k$ is close to $\pi/\epsilon$. Both the smallest coprime $n_1$ (approaching 1 from below) and the largest coprime $n_k$ (approaching 1 from above) are shown to converge to $(\pi/\epsilon)^{1/k}$ matching the convergence in Lemma 3.8 for several values of k.

We can therefore summarize the asymptotics of the noiseless QoPrime algorithm for parameters $\epsilon$, k, q as follows:

| Coprimes | $n_1, \ldots, n_k$ | $=\Theta(1/\epsilon^{1/k})$ |
|---|---|---|
| Max Sampling Depth | $\max_i \dfrac{N}{N_i}$ | $=\Theta(1/\epsilon^{1-q/k})$ |
| Total Oracle Calls | $\Theta\left(\sum_{i=1}^{\lceil k/q \rceil} N_i^2 \times \dfrac{N}{N_i}\right)$ | $\Theta\left(\left\lceil\dfrac{k}{q}\right\rceil 1/\epsilon^{1+q/k}\right)$ (14) |

The QoPrime algorithm analysis from above indicates that, for a given target precision $\epsilon$ and overall failure probability $\delta$, the total number of oracle calls for some embodiments of the Qoprime algorithm may scale as:

$$\mathcal{N}(k, q, \epsilon, \delta) = C \times \left\lceil\dfrac{k}{q}\right\rceil \times \dfrac{1}{\epsilon^{1+q/k}} \times \log\left(\dfrac{4}{\delta}\left\lceil\dfrac{k}{q}\right\rceil\right) \quad (15)$$

The constant C does not depend on the parameters of the algorithm. In fact, experimental results indicate that C is a small constant and, in practice, we can expect C<10. (e.g., see FIG. 4).

In practice, given target precision E and accepted failure probability $\delta$, improved (e.g., optimal) values of k and q are determined such that the number of oracle calls in equation 15 is decreased (e.g., minimized). For example, in this noiseless scenario, the preferred (e.g., optimal) parameter q is 1 (indicating that it is preferred to access the largest allowed depth). Reducing (e.g., minimizing) the oracle call number in equation 15 by choosing k leads to (ignoring the subleading contribution from the failure probability $\delta$):

$$k^*(\epsilon) \approx \log\dfrac{1}{\epsilon} \quad (16)$$

Plugging this back into equation 15 leads to an asymptotic dependency of oracle calls of $1/\epsilon$, up to logarithmic factors, as expected in the quantum regime:

$$\lim_{\epsilon \to 0} \mathcal{N}(\epsilon, \delta) = C \times e \times \dfrac{1}{\epsilon} \log\dfrac{1}{\epsilon} \log\left(\dfrac{4\log\frac{1}{\epsilon}}{\delta}\right) \quad (17)$$

3.4 QoPrime Algorithm with Noise

In this section, we study the performance of the QoPrime AE algorithm under the same depolarizing noise model as we studied for the power law AE algorithm. Inverting the noisy probabilistic model described in equation 2, $\theta$ can be computed as, $$2n\theta = \pm\arccos\left[e^{\gamma n}(1-2p)\right] \mod 2\pi \quad (18)$$

As before, we can use this relation to translate a confidence interval on the probability p (say, $\epsilon_p$), computed by (e.g., classical) postprocessing of measurement samples, to a confidence interval on the angle $\theta$, denoted $\epsilon_\theta$:

$$\epsilon_\theta \leq \dfrac{e^{\gamma n}}{n} \times \sup \dfrac{d\arccos x}{dx} \times \epsilon_p \quad (19)$$

A difference in the noisy case is the exponential stretch factor of $e^{\gamma n}$ enhancing the angle confidence interval. Since a classical confidence interval shrinks as the square root of the number of samples, the number of samples will pick up a factor of $e^{2\gamma n}$ under this noise model (e.g., in order to guarantee the noiseless confidence intervals). This provides the proof of the noisy version of Lemma 3.6:

Lemma 3.9: If $l \in [N_i/6, 5N_i/6]$ and $\gamma \geq 0$ is the depolarizing noise rate per oracle call, then given $$m = 100cN_i^2 e^{2\gamma\frac{N-N_i}{2N_i}}$$

samples, steps 4-5 of the QoPrime AE algorithm determine an estimate such that $|\hat{l} - (-1)^i l \mod N_i| \leq 0.25$ with probability at least $1 - 2e^{-c}$.

Similar to the noiseless algorithm (see (14)), we summarize the asymptotics of the noisy algorithm for parameters $\epsilon$, k, q, $\gamma$ as follows:

| Coprimes | $n_1, \ldots, n_k$ | $=\Theta(1/\epsilon^{1/k})$ |
|---|---|---|
| Sampling Depth | $\max_i \dfrac{N}{N_i}$ | $=\Theta(1/\epsilon^{1-q/k})$ |
| Oracle Calls | $\Theta\left(\sum_{i=1}^{\lceil k/q \rceil} N_i^2 e^{2\gamma N/N_i} \dfrac{N}{N_i}\right)$ | $=\Theta\left(\left\lceil\dfrac{k}{q}\right\rceil \dfrac{1}{\epsilon^{1+q/k}} e^{2\gamma(\frac{\pi}{\epsilon})^{1-q/k}}\right)$ (20) |

Therefore, for a given target precision $\epsilon$, depolarizing noise level $\gamma$, and overall failure probability $\delta$, the total number of oracle calls may scale as:

$$\mathcal{N}(k, q, \gamma, \epsilon, \delta) = C \times \left\lceil\dfrac{k}{q}\right\rceil \times \dfrac{1}{\epsilon^{1+q/k}} \times \exp\left(2\gamma\left(\dfrac{\pi}{\epsilon}\right)^{1-q/k}\right) \times \log\left(\dfrac{4}{\delta}\left\lceil\dfrac{k}{q}\right\rceil\right) \quad (21)$$

where C is the same constant overhead as in equation 15. Similar to the power law AE algorithm, in practice, given target precision $\epsilon$, noise level $\gamma$, and accepted failure probability $\delta$, we can determine improved (e.g., optimal) values of k and q such that the number of oracle calls in equation 21 is reduced (e.g., minimized). See also FIG. 3 for the behavior of the number of oracle calls for different values of k and q.

Figure 3:
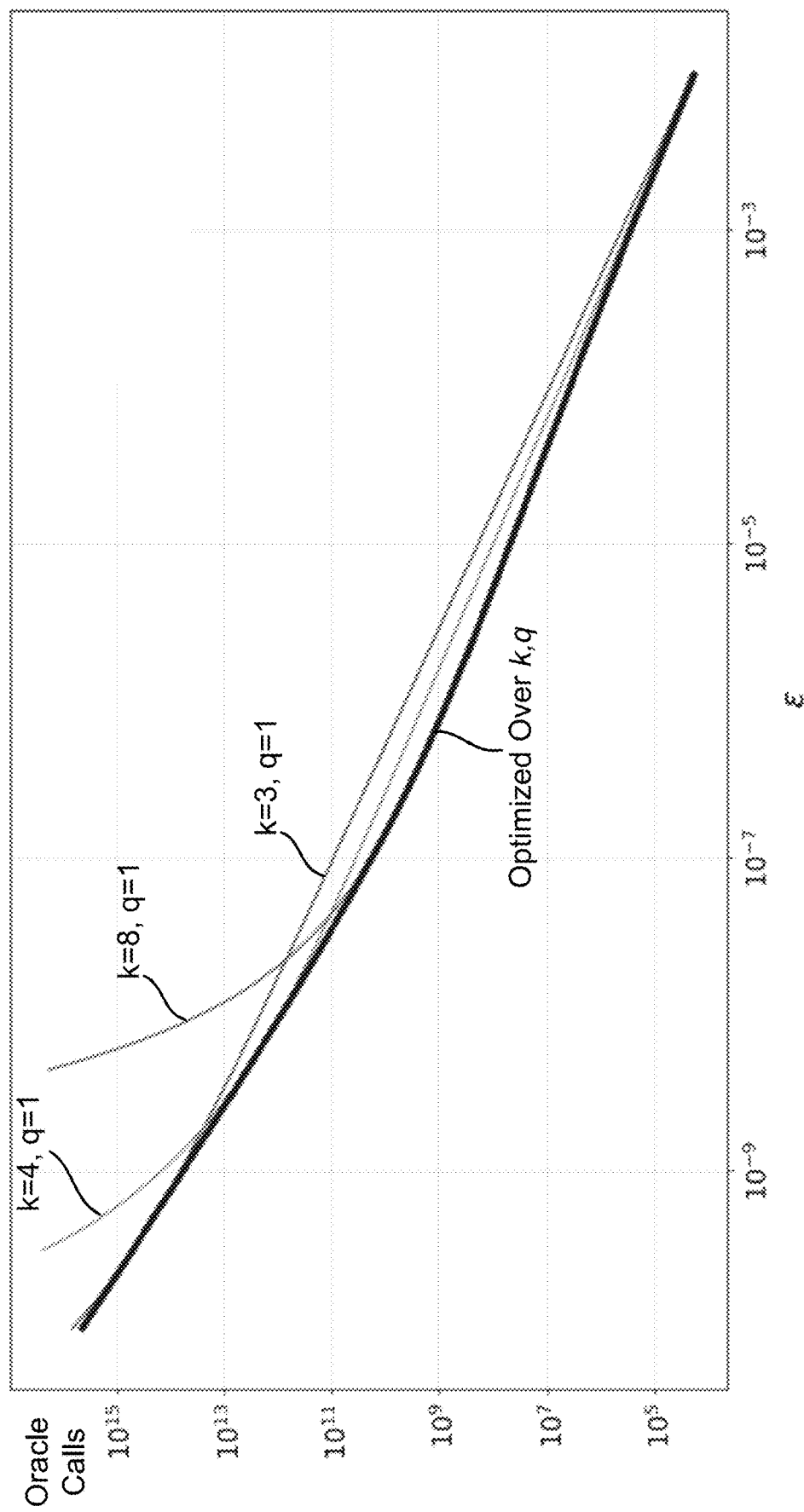
FIG. 3 illustrates a plot of the behavior of the oracle call dependency in equation 21 for the Qoprime algorithm.

More specifically, FIG. 3 illustrates a plot of the behavior of the oracle call dependency in equation 21 for several values of parameters k and q, and for fixed noise level $\gamma = 10^{-5}$ and probability of failure $\delta = 10^{-5}$. When taking the minimum over the family of curves parametrized by all valid k and q (here assumed continuous for simplicity), we obtain the envelope of the improved (e.g., optimal) QoPrime algorithm (labeled "Optimized Over k, q"). This emergent behavior smoothly interpolates between a classical $1/\epsilon^2$ scaling in the noise-dominated region $\epsilon \ll \gamma$ and a quantum scaling $1/\epsilon$ in the coherent region $\epsilon \ll \gamma$.

Figure 4:
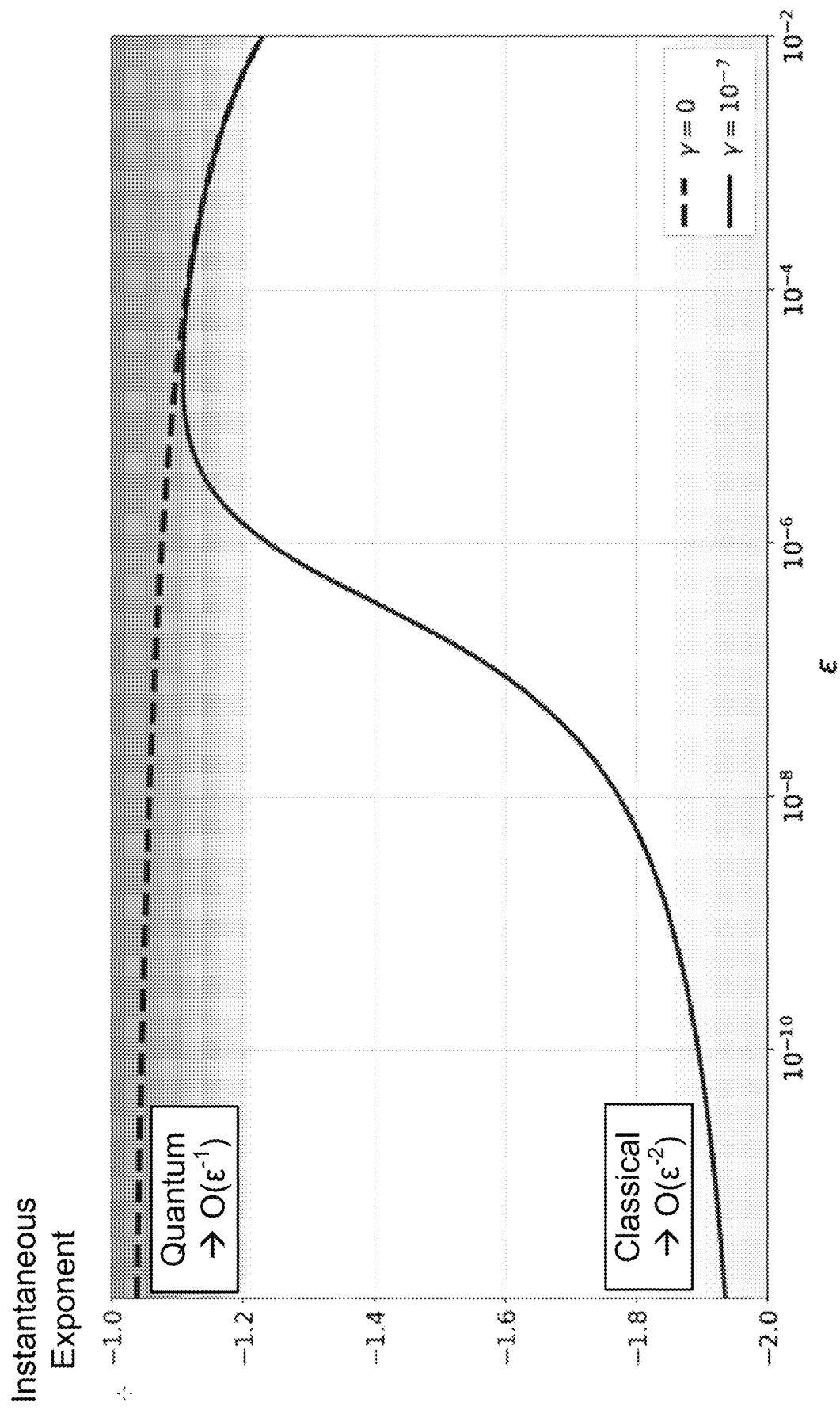
FIG. 4 illustrates a plot of the transition from coherent to noise dominated as measured by the instantaneous exponent $$\frac{d\log \mathcal{N}}{d\log \epsilon},$$

Determining (e.g., optimizing) over k and q in this manner may result in the effective scaling of oracle calls as a function of E being (e.g., always) between the classical scaling of $1/\epsilon^2$ and the quantum scaling $1/\epsilon$ (see FIG. 4). Specifically, this can be formulated as a bound on the instantaneous exponent:

$$-2 \leq \lim_{\epsilon \to 0} \frac{d \inf_{k,q} \log \mathcal{N}(\epsilon, \gamma, \delta, k, q)}{d \log \epsilon} \leq -1 \quad (22)$$

FIG. 4 illustrates a plot of the transition from coherent to noise dominated as measured by the instantaneous exponent $$\frac{d \log \mathcal{N}}{d \log \epsilon},$$

where $\mathcal{N}$ is the number oracle calls optimized over parameters k and q.

In the noise-dominated limit, the improved (e.g., optimal) parameter q tends to its upper bound q=k−1 (corresponding to the shallowest accessible circuits). Using this observation, we can analytically study the optimization over k using the dependency in equation 21 and obtain that the improved (e.g., optimal) k parameter may have the form (in a continuous approximation):

$$k^*(\epsilon, \gamma) \approx \frac{\log \frac{\pi}{\epsilon}}{\log \frac{1}{\epsilon} \frac{1}{2\gamma \log \frac{\pi}{\epsilon}}} \quad (23)$$

This allows us to study the asymptotic dependency of oracle calls on the target precision $\epsilon$ analytically. Extracting the low-$\epsilon$ limit yields:

$$\lim_{\epsilon \to 0, \gamma \gg \epsilon} \mathcal{N}(\epsilon, \gamma, \delta) = 2C \times 2\gamma e \times \log\left(\frac{8}{\delta}\right) \times \frac{1}{\epsilon^2}, \quad (24)$$

where C is the constant prefactor introduced in equation 21. This classical-limit curve can be used to compare the asymptotic runtime of the Qoprime algorithm to classical Monte Carlo techniques.

Outside of the two noise limits, specifically noise-dominated equation 24 and noiseless equation 17, the improved (e.g., optimal) parameters k and q may depend non-trivially on the problem, and they may be determined numerically. Example (k, q) improved (e.g., optimal) trajectories obtained by optimizing equation 21 are shown in FIG. 5.

FIG. 5 illustrates a plot of the trajectory of optimal estimates for k, q parameters chosen by reducing (e.g., minimizing) the asymptotic dependency in equation 21, for two different noise levels ($\gamma=10^{-4}$ and $\gamma=10^{-8}$). The optimization estimate is over continuous k, q for simplicity. The green region marks the valid parameter region k≥2, 1≤q≤k−1. The arrows show the direction of the parameters as the target precision $\epsilon$ is being lowered from $\epsilon=10^{-3}$ to $\epsilon=10^{-10}$. While for $\epsilon \ll \gamma$ (noiseless regime), we have that q=1.

4. Empirical Results

In this section, we present empirical results for the power law and the QoPrime AE algorithms and compare them with other amplitude estimation algorithms. The experimental results validate the theoretical analysis and provide further insight in the behavior of these low depth algorithms in noisy regimes.

4.1 The Power Law AE

FIG. 6 compares the theoretical and empirically observed scaling for the number of oracle calls N as a function of the error rate $\epsilon$ in the power law AE algorithm in the absence of noise, i.e., $\gamma=0$. We numerically simulated the power law AE algorithm for randomly chosen $\theta \in [0, \pi/2]$ and with $$m_k = \left\lfloor k^{\frac{1-\beta}{2\beta}} \right\rfloor$$

for fixed values of parameter $\beta \in \{0.455, 0.714\}$, which make the exponent be $\{0.2, 0.6\}$ respectively. We also provide the extremal cases of $\beta \in \{0,1\}$. The experimental results agree closely with the predictions of the theoretical analysis.

More specifically FIG. 6 illustrates a plot of the performance of the power law AE algorithm in theory (solid lines) and practice (dots and triangles) using the schedule $$m_k = \left\lfloor k^{\frac{1-\beta}{2\beta}} \right\rfloor$$

for values $\beta=0.455$ and $\beta=0.714$, for different error rates $\epsilon$. The true value is $\theta^*$ is chosen at random. We took the number of shots $N_{shot}=100$. Applying linear regression to these experimental data points, gives slopes −1.718 and −1.469, whereas the theoretical slopes are −1.714 and −1.455 for the circle and triangle points respectively.

FIG. 7 shows the scaling of the power law AE algorithm under several noise levels. Here, the parameter $\beta$ is chosen adaptively, based on the error rate $\epsilon$ and noise level $\gamma$. For target errors below the noise level, we can use the exponential schedule to get the improved (e.g., optimal) quantum scaling. After this threshold, we use the power law schedules with exponents chosen as in Proposition 2.5. The result is that for these smaller target errors, the scaling is in between the improved (e.g., optimal) quantum and the classical scaling.

More specifically, FIG. 7 illustrates a plot of the performance of the power law AE algorithm in theory (solid lines) and practice (dots, triangles, and squares) using power law schedules where the parameter $\beta$ is improved (e.g., optimized) for given $\epsilon$ and $\gamma$. Also, the classical and quantum scalings are plotted for comparison. For small target errors, we obtain the improved (e.g., optimal) quantum scaling, while for smaller target errors we use power law exponents using Proposition 2.5. The result is that the scaling approaches the classical scaling as the target error goes to 0.

4.2 The QoPrime Algorithm

The parameters k and q for the QoPrime algorithm may be determined improving (e.g., optimizing) over the Chernoff upper-bounds obtained in Lemma 3.9 and described in equation 20. FIG. 8 shows the theoretical upper bounds (solid lines) and the empirically observed number of oracle calls (dots, triangles, and squares) as a function of the accuracy E for different noise rates ($\gamma$). The algorithm in practice (dots, triangles, and squares) performs better than the theoretical bounds (lines) because it computes the confidence intervals using exact binomial distributions as opposed to the Chernoff bounds in the theoretical analysis.

More specifically, FIG. 8 illustrates a plot of the performance of the QoPrime algorithm under several noise levels ($\gamma$). Shown are both theoretical upper bounds (solid lines) and the simulated oracle calls (dots, triangles, and squares) for three scenarios: noiseless (circles), depolarizing rate $\gamma=10^{-7}$ (squares), and depolarizing rate $\gamma=10^{-5}$ (triangles). The classical Monte Carlo curve (dashed line) is obtained by assuming noiseless classical sampling from a constant oracle depth of 1. We see the curve follows a quantum $\epsilon^{-1}$ scaling for small errors $\epsilon \ll \gamma$, which transitions into a classical $\epsilon^{-2}$ dependency when the precision is much smaller than the noise level ($\epsilon \ll \gamma$).

FIG. 9 plots the maximum oracle depth as a function of the target precision $\epsilon$ for the QoPrime algorithm in noiseless ($\gamma=0$) and noisy settings ($\gamma \neq 0$), as well as for the IQAE algorithm.

More specifically, FIG. 9 illustrates a plot of the maximum oracle depth as a function of the target precision $\epsilon$. The noiseless QoPrime algorithm and the IQAE algorithm in both have a similar scaling of depth as $O(\epsilon^{-1})$. However, introducing a depolarizing noise level $\gamma$ provides a bound for the depth used by the QoPrime algorithm. Specifically, the plot suggests that some embodiments QoPrime algorithm generally cannot access circuit depths higher than the noise scale $\gamma$, which corresponds to exponentially suppressed confidence intervals, and the algorithm may require exponentially more samples to produce a good estimate.

FIG. 10 provides empirical estimates for the constant factor C for the QoPrime algorithm in noisy settings. The observed value of C is a small constant and the simulations show that C<10 over a wide range of E and noise rates that cover most settings of interest. More specifically, FIG. 10 illustrates a plot of empirical values of the constant prefactor C, as described in Equation (21) above, on the target precision $\epsilon$ for an arbitrary value of the true angle $\theta$ and failure probability $\delta=10^{-5}$.

4.3 Benchmarking

This section compares the performance of the Power law and QoPrime AE algorithms against the amplitude estimation algorithm referred to as IQAE (Iterative Quantum Amplitude Estimation algorithm) and described in D. Grinko, J. Gacon, C. Zoufal, and S. Woerner, "Iterative quantum amplitude estimation," arXiv preprint arXiv: 1912.05559, 2019.

FIG. 11 plots the performance of the Power Law, the QoPrime, and the IQAE for the noise level of $\gamma=10^{-3}$. The performance is measured by the total number of oracle calls for target accuracy $\epsilon$. The plot emphasizes the advantage of the Power law and the QoPrime over algorithms such as IQAE (IQAE requires access to a circuit of depth of $O(1/\epsilon)$. In this scenario, the large depth of the IQAE is exponentially penalized by the depolarizing noise. Thus, IQAE requires an exponentially large number of classical samples to achieve a precision below the noise level. In comparison, the power law and the QoPrime AE algorithms transition smoothly to a classical estimation scaling (said differently, they become generally parallel with the classical scaling) and do not suffer from an exponential growth in oracle calls. In these simulation results, the Power law AE algorithm has the best practical performance (because it uses less oracle calls than QoPrime).

5. Regularity Conditions for Bernstein Von-Mises Theorem

We enumerate the regularity conditions for the Bernstein Von Mises theorem (Provided in section 2.1) for power law schedules. Let us consider a schedule where k oracle calls in series are made $N_k$ times, where measurements (e.g., in the standard basis) and Bayesian updates are performed after each of the $N_k$ shots. The variable $N_{k_0}$ and $N_{k_1}$ represent the number of times outcomes 0 and 1 are observed in the $N_k$ measurements. The probability density function and the log likelihood may be given by, $$f(X, \theta) = \frac{1}{Z} \prod_k \cos^2((2k+1)\theta)^{N_{k_0}} \sin^2((2k+1)\theta)^{N_{k_1}} \quad (25)$$

$$l(X, \theta) = \sum_k 2N_{k_0} \log \cos((2k+1)\theta) + 2N_{k_1} \log \sin((2k+1)\theta) + \log Z \quad (26)$$

The regularity conditions for the Bernstein Von-Mises Theorem state that there is a suitable domain $\Theta$ such that the following statements hold for all possible values of the measurement outcomes X and for some integer $s \geq 2$:

Statement 1: $f(X, \theta)$ is continuous on $\Theta$.

Statement 2: $l(X, \theta)$ is continuous on $\overline{\Theta}$.

Statement 3: For every $\theta \in \Theta$ there is an open neighborhood $U_\theta$ such that for $\sigma, \tau \in U$ we have $E_\sigma(l(X,\tau)^s)$ is bounded. (More precisely, the supremum of $E_\sigma(l(X,\tau)^s)$ is finite).

Statement 4: For every $(0, \tau) \in (\Theta, \overline{\Theta})$ there exist neighborhoods U and V of $\theta, \tau$ (these neighborhoods depend on $\theta$ and $\tau$) such that the supremum $E_\sigma |\inf_{\delta \in V} l(X, \delta)|^s$ over all $\sigma \in U$ is finite.

Statement 5: $l(X, \theta)$ is twice differentiable on $\Theta$.

Statement 6: For all $\theta \in \Theta$ there is a neighborhood $U_\theta$ such that for all $\tau \in U_\theta$, $$0 < E_\tau[l''(X,\tau)^s] < \infty \quad (27)$$

This is the s-th moment of the Fisher information.

Statement 7: There are neighborhoods U for all $\theta$ and a bounded function $k_\theta: X \to \mathbb{R}$ such that, $$\|\{l''(X,\tau) - l''(X,\sigma)\| \leq \|\tau - \sigma\| k_\theta(X) \quad (28)$$

for all $\tau, \sigma \in U$.

Statement 8: The prior probability $\lambda$ is positive on $\Theta$ and 0 on $\mathbb{R} \setminus \Theta$.

Statement 9: For every $\theta \in \Theta$ there is a neighborhood $U_\Theta$ such that for all $\sigma, \tau \in U_\theta$ and constant $c_\theta > 0$ such that, $$|\log \lambda(\sigma) - \log \lambda(\tau)| \leq \|\sigma - \tau\| c_\theta \quad (29)$$

This is equivalent to the continuity of $\lambda'$ on $\Theta$.

These regularity conditions above can be sub-divided into three groups as follows:

Statements 1-4 are about the smoothness of $f(X, \theta)$ and $l(X, \theta)$, they may be satisfied if the norm of log-likelihood is bounded on $\Theta$. We can choose $\Theta$ to be a subinterval around the true value for which the log-likelihood is bounded.

Statements 5-7 are about the smoothness of the Fisher information on $\Theta$. They assert that the Fisher information is bounded on $\Theta$ and is differentiable, this means that the log-likelihood function should have derivatives of order at least 3.

Statements 8-9 are about the smoothness of the prior distribution, namely that the first derivative of the prior should be a continuous function. These are trivially true for the uniform distribution.

Referring back to FIG. 1, the graph illustrates that the log-likelihood function is smooth over a neighborhood of the true value indicating that the regularity conditions for the Bernstein-Von Mises theorem are plausible in this setting, for a large neighborhood Θ to be around the true value. Algorithm 2.1 is stated with Θ as the entire [0,π/2] interval as this choice seems to work in practice, one can also imagine a slightly modified algorithm where the first few sampling rounds are used to get a rough estimate for the true value lying in a large interval Θ and for subsequent rounds the prior is uniform on Θ, with convergence established using the Bernstein Von-Mises theorem. Adding noise may further regularize the log-likelihood functions and enforce the regularity conditions of the Bernstein-Von Mises theorem.

6. Example Methods

6.1 Example Method of Power Law Algorithm

FIG. 12 is a flow chart illustrating a first method of operating a quantum computing system to determine θ of a unitary operator U within an error $\epsilon$, where $U|0^t\rangle = \cos(\theta)|x, 0\rangle + \sin(\theta)|x', 1\rangle$, according to one embodiment. The method may be performed with success probability at least p. The steps of method may be performed in different orders, and the method may include different, additional, or fewer steps. The method is described as being performed by a computing system that, for example, includes a classical computing system and quantum computing system. The computing system may perform the operations of the method by executing instructions stored on a non-transitory computer readable storage medium. The method in FIG. 12 may be considered an embodiment of the Power Law algorithm. For example, the steps may be similar to the steps in Algorithm 2.1.

The computing system (e.g., the classical computing system) determines 1205 a parameter $\beta \in (0,1)$ (exclusive of 0 and 1). The parameter β determines how quickly the circuit depth grows (circuit depth is given by $m_k$) for growing values of k (further described below). Viewed differently, parameter β determines the tradeoff between circuit depth and speedup. β may be determined based on the noise of the computing system (e.g., the quantum computing system). In some embodiments, the parameter β may be determined using the techniques described in Section 4.

The computing system (e.g., the classical computing system) determines 1210 an initial probability distribution p(θ) for a set of angles θ. The initial distribution may be a prior probability distribution (referred to as a prior). A prior is a probability distribution that reflects an initial estimate or guess before additional information is accounted for. In some embodiments, the distribution is a (e.g., uniform) distribution for angles described by $$\theta = \frac{\pi t \epsilon}{2}.$$

One may think of this as discretizing the possible angles (e.g., [0,π/2]) into a number of bins (e.g., 1/ϵ) of size τϵ/2. The variable t may then be an integer greater than zero that numbers those bins (e.g., t∈[0,1/ϵ]). Note that t is not related to the superscript t in $|0^t\rangle$.

For k=1 to K, steps 1215-1235 are performed in a loop. Generally, K is selected to be as big as possible given the circuit depth capabilities of the quantum computing system. In some embodiments, K is defined as $$K = \max\left(\frac{1}{\epsilon^{2\beta}}, \log(1/\epsilon)\right),$$

which means that the value of K is the larger of $$\frac{1}{\epsilon^{2\beta}}$$

and log(1/ϵ). In these embodiments, this results in the method following the exponential schedule as β→0.

The computing system (e.g., the classical computing system) initializes 1215 $N_{k0}=0$ and $N_{k1}=0$.

For i=1 to $N_{shots}$, steps 1220-1230 are performed in a loop. $N_{shots}$ is an integer that specifies the number of shots taken at each value of k. Said differently, $N_{shots}$ specifies the number of samples taken at a circuit depth specified by $m_k$. $N_{shots}$ may be determined during step 1205. If it is desirable to reduce (e.g., minimize) the total number of oracle calls, it may be desirable to reduce $N_{shots}$ (since $N_{shots}$ affects the total number of oracle calls).

The quantum computing system sequentially executes 1220 the unitary operator $$\left\lfloor k^{\frac{1-\beta}{2\beta}} \right\rfloor$$

times. Said differently, the quantum computing system executes a quantum circuit that includes the unitary operator $$\left\lfloor k^{\frac{1-\beta}{2\beta}} \right\rfloor$$

times in a sequence. This creates a quantum state on the quantum computing system.

The quantum computing system measures 1225 a qubit of the resulting quantum state (e.g., in a standard basis). The qubit may be the last qubit (as previously described). More generally, any marked state may be measured (e.g., corresponding to more than one qubit). For example, the quantum computing system measures whether two qubits are both 0.

The computing system (e.g., the classical computing system) updates 1230 the value of $N_{k0}$ or $N_{k1}$ based on the measurement. $N_{k0}$ indicates the number of times a value of 0 is measured and $N_{k1}$ indicates the number of times a value of 1 is measured. For example, responsive to a value of the qubit being 0, the value of $N_{k0}$ is updated to be $N_{k0}+1$, and responsive to the value of the qubit being 1, the value of $N_{k1}$ is updated to be $N_{k1}+1$.

The computing system (e.g., the classical computing system) updates 1235 the probability distribution based on the updated values of $N_{k0}$ or $N_{k1}$. For example, the update is a Bayesian update. The Bayesian update may include $p(\theta) \rightarrow p(\theta)\cos((2m_k+1)\theta)^{N_{k0}} \sin((2m_k+1)\theta)^{N_{k1}}$, for θ=πtϵ/2 for integer $t\in[0,1/\epsilon]$. The updated probability distribution may be referred to as a posterior probability distribution.

The computing system (e.g., the classical computing system) determines 1240 $\theta$ based on the updated probability distribution. In some embodiments, the determined value of $\theta$ corresponds to the highest probability of the posterior probability distribution. Thus, $\theta$ may be determined by determining what value of $\theta$ corresponds to the highest probability (e.g., within a threshold error) of the posterior probability distribution. In some embodiments, $\theta$ is determined within error E with probability at least 0.9.

In some embodiments, the total number of times U is executed on the quantum computing system to determine $\theta$ scales as $O(1/\epsilon^{1+\beta})$.

In some embodiments, the number of times the unitary operator U is sequentially executed in a single run scales as $$O\left(\frac{1}{\epsilon^{1-\beta}}\right).$$

In some embodiments, the number is not more than $$O\left(\frac{1}{\epsilon^{1-\beta}}\right).$$

6.2 Example Method for QoPrime Law Algorithm

FIG. 13 is a flow chart illustrating a second method of operating a quantum computing system to determine $\theta$ of a unitary operator U within an error $\epsilon$, where $U|0'\rangle = \cos(\theta)|x, 0\rangle + \sin(\theta)|x', 1\rangle$, according to one embodiment. The method may be performed with success probability at least p, where $1-2ke^{-2c} > p$ for constant c. The steps of method may be performed in different orders, and the method may include different, additional, or fewer steps. The method is described as being performed by a computing system that, for example, includes a classical computing system and quantum computing system. The computing system may perform the operations of the method by executing instructions stored on a non-transitory computer readable storage medium. The method in FIG. 13 may be considered an embodiment of the QoPrime algorithm. For example, the steps may be similar to the steps in Algorithm 3.1.

The computing system (e.g., the classical computing system) determines 1305 integer parameters k and q, where $k \geq 2$ and $1 \leq q \leq (k-1)$. k specifies the number of moduli determined in step 1310. q specifies the number of moduli grouped together in step 1315. The parameters k and q may be determined using the techniques described in Section 4.

The computing system (e.g., the classical computing system) determines 1310 a set of k co-prime moduli $(n_1, n_2, \ldots, n_k)$. $N = \prod_{i \in [k]} n_i$ describes the product of the co-prime moduli in the set. The co-prime moduli in the set may be determined so that $N \geq \pi/\epsilon$. Each modulus in the set is an integer. Additionally, the co-prime moduli may be odd. Alternatively, one of them may be even. The set of k co-prime moduli may be selected to be close to $\lfloor 1/\epsilon^{1/k} \rfloor$. For example, the set includes k integers that have the smallest average difference from $1/\epsilon^{1/k}$. In some embodiments, the set of k co-prime moduli are determined using techniques described in Section 3.3.

The computing system (e.g., the classical computing system) partitions 1315 the set of k co-prime moduli $(n_1, n_2, \ldots, n_k)$ into $\lceil k/q \rceil$ groups $\pi_i$ of size at most q.

At step 1320 (labeled "If Condition"), the computing system (e.g., the classical computing system) may perform the following operations. Responsive to $q/k \geq \frac{1}{3}$, the computing system uses a number (e.g., greater than 0 and at most $$\frac{24c}{\epsilon^{1+q/k}})$$

of depth 0 samples to obtain an additive error (e.g., $$\frac{1}{2\epsilon^{1-q/k}})$$

estimate for $\theta$. A depth 0 sample refers to performing a single oracle call (executing a circuit with a single instance of the unitary operator U). This may be done at a threshold probability (e.g., at least $1-e^{-2c}$, where c is a constant). For more information, see step 4 of algorithm 3.1.

Responsive to $q/k < \frac{1}{3}$, the computing system may perform the method of FIG. 13 recursively to obtain an additive error estimate for $\theta$. For example, the method is invoked recursively with accuracy $\epsilon' = O(1/\epsilon^{1-q/k})$ and $q'/k'$ such that $$1 + q/k < 1 + q'/k' < \frac{(1+q/k)}{(1-q/k)}.$$

For more information, see step 6 of algorithm 3.1.

For i=1 to $\lceil k/q \rceil$, steps 1325-1340 are performed in a loop.

For $\alpha=1$ to A, steps 1325-1335 are performed in a loop. In some embodiments, the number of iterations A is 100 $cN_i^2$, where $N_i = \prod_{j \in \pi_i} n_j$. As demonstrated in Lemma 3.6, this number of samples is sufficient to get to a good estimate with probability $1-2e^{-2c}$. However, the number of interactions may be more or less.

The quantum computing system executes 1325 the unitary operator U to generate a quantum state $|\phi_{(N-N_i)/2N_i}\rangle$ defined by $|\phi_\mu\rangle = \cos((2\mu+1)\theta)|x, 0\rangle + \sin((2\mu+1)\theta)|x', 1\rangle$. This may be implemented by the quantum computing system running a program that includes the unitary operator U as a subroutine. For example, $|\phi_{(N-N_i)/2N_i}\rangle$ is prepared by sequentially executing the unitary operator U $(2((N-N_i)/2N_i)+1)$ times.

The quantum computing system measures 1330 the generated quantum state $|\phi_{(N-N_i)/2N_i}\rangle$ (e.g., in the standard basis). For example, the quantum computing system measures all of the qubits involved. In another example, the quantum computing system just measures the one or more qubits corresponding to the marked state.

The computing system (e.g., the classical computing system) records 1335 the measured quantum state.

The computing system (e.g., the classical computing system) determines 1340 $\overline{M}_i$ based on an observed probability that the measurement of particular qubit is 0 (this qubit may be predetermined). More generally, $\overline{M}_i$ is determined based on an observed probability of measuring 0 for a marked state, where a single qubit is may be chosen as the marked state. In some embodiments, determining $\overline{M}_i$ comprises: determining $$\hat{l} = \frac{2N_i}{\pi}$$

arccos($\sqrt{\hat{p}}$), where $\hat{p}$ is an observed probability of outcome 0, and determining $\overline{M_I} = (-1)^t \hat{l} \mod N_i$, where t determines the sign of $\overline{M_I}$ (note that t is not related to the superscript t in $|0^t\rangle$). Determining $\overline{M_I}$ may further comprise determining $M_i = \lfloor \overline{M_I} + \beta_i \rfloor$, where $\beta_i \in [-0.25, 0.25]$ such that $\{\overline{M_I} + \beta_i\} = \alpha$ and $\alpha$ is a number in the interval $I = \cap_i ([\overline{M_I} - 0.25, \overline{M_I} + 0.25] \mod 1)$. Steps 10-12 of Algorithm 3.1 may provide more information.

The computing system (e.g., the classical computing system) constructs 1345 $\overline{M} \mod N$ by applying the Chinese Remainder Theorem (e.g., Theorem 3.1) to values based on $\overline{M_I}$.

The computing system (e.g., the classical computing system) determines 1350 $\theta$ based on $\overline{M}$. For example, $\theta$ is determined by computing $$\frac{\pi(\overline{M} + \alpha)}{2N}.$$

In some embodiments, the total number of times the unitary operator U is executed by the quantum computing system determine $\theta$ scales as $O(1/\epsilon^{1+q/k})$.

In some embodiments, the number of times the unitary operator U is sequentially executed in a single run scales as $O(1/\epsilon^{1-q/k})$. In some embodiments, the number is not more than $O(1/\epsilon^{1-q/k})$.

7. Description of a Computing System

FIG. 14A is a block diagram that illustrates an embodiment of a computing system 1400. The computing system 1400 includes a classical computing system 1410 (also referred to as a non-quantum computing system) and a quantum computing system 1420. The classical computing system 1410 may control the quantum computing system 1420. An embodiment of the classical computing system 1410 is described further with respect to FIG. 15. While the classical computing system 1410 and quantum computing system 1420 are illustrated together, they may be physically separate systems (e.g., in a cloud architecture). In other embodiments, the computing system 1400 includes different or additional elements (e.g., multiple quantum computing systems 1420). In addition, the functions may be distributed among the elements in a different manner than described.

FIG. 14B is a block diagram that illustrates an embodiment of the quantum computing system 1420. The quantum computing system 1420 includes any number of quantum bits ("qubits") 1450 and associated qubit controllers 1440. As illustrated in FIG. 14C, the qubits 150 may be in a qubit register of the quantum computing system 1420. Qubits are further described below. A qubit controller 1440 is a module that controls one or more qubits 1450. A qubit controller 1440 may include a classical processor such as a CPU, GPU, or FPGA. A qubit controller 1440 may perform physical operations on one or more qubits 1450 (e.g., it can perform quantum gate operations on a qubit 1440). In the example of FIG. 14B, a separate qubit controller 1440 is illustrated for each qubit 1450, however a qubit controller 1450 may control multiple (e.g., all) qubits 1450 of the quantum computing system 1420 or multiple controllers 1450 may control a single qubit. For example, the qubit controllers 1450 can be separate processors, parallel threads on the same processor, or some combination of both. In other embodiments, the quantum computing system 1420 includes different or additional elements. In addition, the functions may be distributed among the elements in a different manner than described.

FIG. 14D is a flow chart that illustrates an example execution of a quantum routine on the computing system 1400. The classical computing system 1410 generates 1460 a quantum program to be executed or processed by the quantum computing system 1420. The quantum program may include instructions or subroutines to be performed by the quantum computing system 1420. In an example, the quantum program is a quantum circuit. This program can be represented mathematically in a quantum programming language or intermediate representation such as QASM or Quil.

The quantum computing system 1420 executes 1465 the program and computes 1470 a result (referred to as a shot or run). Computing the result may include performing a measurement of a quantum state generated by the quantum computing system 1420 that resulted from executing the program. Practically, this may be performed by measuring values of one or more of the qubits 1450. The quantum computing system 1420 typically performs multiple shots to accumulate statistics from probabilistic execution. The number of shots and any changes that occur between shots (e.g., parameter changes)) may be referred to as a schedule. The schedule may be specified by the program. The result (or accumulated results) is recorded 1475 by the classical computing system 1410. Results may be returned after a termination condition is met (e.g., a threshold number of shots occur).

FIG. 15 is an example architecture of a classical computing system 1410, according to an embodiment. The quantum computing system 1420 may also have one or more components described with respect to FIG. 15. Although FIG. 15 depicts a high-level block diagram illustrating physical components of a computer system used as part or all of one or more entities described herein, in accordance with an embodiment. A computer may have additional, less, or variations of the components provided in FIG. 15. Although FIG. 15 depicts a computer 1500, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 15 are at least one processor 1502 coupled to a chipset 1504. Also coupled to the chipset 1504 are a memory 1506, a storage device 1508, a keyboard 1510, a graphics adapter 1512, a pointing device 1514, and a network adapter 1516. A display 1518 is coupled to the graphics adapter 1512. In one embodiment, the functionality of the chipset 1504 is provided by a memory controller hub 1520 and an I/O hub 1522. In another embodiment, the memory 1506 is coupled directly to the processor 1502 instead of the chipset 1504. In some embodiments, the computer 1500 includes one or more communication buses for interconnecting these components. The one or more communication buses optionally include circuitry (sometimes called a chipset) that interconnects and controls communications between system components.

The storage device 1508 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 1508 can also be referred to as persistent memory. The pointing device 1514 may be a mouse, track ball, or other type of pointing device, and is used in combination with the keyboard 1510 to input data into the computer 1500. The graphics adapter 1512 displays images and other information on the display 1518. The network adapter 1516 couples the computer 1500 to a local or wide area network.

The memory 1506 holds instructions and data used by the processor 1502. The memory 1506 can be non-persistent memory, examples of which include high-speed random access memory, such as DRAM, SRAM, DDR RAM, ROM, EEPROM, flash memory.

As is known in the art, a computer 1500 can have different or other components than those shown in FIG. 15. In addition, the computer 1500 can lack certain illustrated components. In one embodiment, a computer 1500 acting as a server may lack a keyboard 1510, pointing device 1514, graphics adapter 1512, or display 1518. Moreover, the storage device 1508 can be local or remote from the computer 1500 (such as embodied within a storage area network (SAN)).

As is known in the art, the computer 1500 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 1508, loaded into the memory 1506, and executed by the processor 302.

Referring back to FIGS. 14A-14C, the quantum computing system exploits the laws of quantum mechanics in order to perform computations. A quantum processing device, quantum computer, quantum processor, and quantum processing unit are each examples of a quantum computing system. A quantum computing system can be a universal or a non-universal quantum processing device (a universal quantum device can execute any possible quantum circuit (subject to the constraint that the circuit doesn't use more qubits than the quantum device possesses)). Quantum processing devices commonly use so-called qubits, or quantum bits. While a classical bit always has a value of either 0 or 1, a qubit is a quantum mechanical system that can have a value of 0, 1, or a superposition of both values. Example physical implementations of qubits include superconducting qubits, spin qubits, trapped ions, arrays of neutral atoms, and photonic systems (e.g., photons in waveguides). For the purposes of this disclosure, a qubit may be realized by a single physical qubit or as an error-protected logical qubit that itself comprises multiple physical qubits. The disclosure is also not specific to qubits. The disclosure may be generalized to apply to quantum processors whose building blocks are qudits (d-level quantum systems, where d≥2) or quantum continuous variables, rather than qubits.

A quantum circuit is an ordered collection of one or more gates. A sub-circuit may refer to a circuit that is a part of a larger circuit. A gate represents a unitary operation performed on one or more qubits. Quantum gates may be described using unitary matrices. The depth of a quantum circuit is the least number of steps needed to execute the circuit on a quantum computer. The depth of a quantum circuit may be smaller than the total number of gates because gates acting on non-overlapping subsets of qubits may be executed in parallel. A layer of a quantum circuit may refer to a step of the circuit, during which multiple gates may be executed in parallel. In some embodiments, a quantum circuit is executed by a quantum computing system. In this sense a quantum circuit can be thought of as comprising a set of instructions or operations that a quantum computing system can execute. To execute a quantum circuit on a quantum computing system, a user may inform the quantum computing system what circuit is to be executed. A quantum computing system may include both a core quantum device and a classical peripheral/control device (e.g., a qubit controller) that is used to orchestrate the control of the quantum device. It is to this classical control device that the description of a quantum circuit may be sent when one seeks to have a quantum computer execute a circuit.

A variational quantum circuit may refer to a parameterized quantum circuit that is executed many times, where each time some of the parameter values may be varied. The parameters of a parameterized quantum circuit may refer to parameters of the gate unitary matrices. For example, a gate that performs a rotation about the y axis may be parameterized by a real number that describes the angle of the rotation. Variational quantum algorithms are a class of hybrid quantum-classical algorithm in which a classical computer is used to choose and vary the parameters of a variational quantum circuit. Typically, the classical processor updates the variational parameters based on the outcomes of measurements of previous executions of the parameterized circuit.

The description of a quantum circuit to be executed on one or more quantum computers may be stored in a non-transitory computer-readable storage medium. The term "computer-readable storage medium" should be taken to include a single medium or multiple media (e.g., a centralized or distributed database, or associated caches and servers) able to store instructions. The term "computer-readable medium" shall also be taken to include any medium that is capable of storing instructions for execution by the quantum computer and that cause the quantum computer to perform any one or more of the methodologies disclosed herein. The term "computer-readable medium" includes, but is not limited to, data repositories in the form of solid-state memories, optical media, and magnetic media.

The approaches described above may be amenable to a cloud quantum computing system, where quantum computing is provided as a shared service to separate users. One example is described in patent application Ser. No. 15/446,973, "Quantum Computing as a Service," which is incorporated herein by reference.

8. Additional Considerations

The disclosure above describes example embodiments for purposes of illustration only. Any features that are described as essential, important, or otherwise implied to be required should be interpreted as only being required for that embodiment and are not necessarily included in other embodiments.

Additionally, the above disclosure often uses the phrase "we" (and other similar phases) to reference an entity that is performing an operation (e.g., a step in an algorithm). These phrases are used for convenience. These phrases may refer to a computing system (e.g., including a classical computing system and a quantum computing system) that is performing the described operations.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. In some cases, a module can be implemented in hardware, firmware, or software.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate+/−10% unless another meaning is apparent from the context. From example, "approximately ten" should be understood to mean "in a range from nine to eleven."

Alternative embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. As used herein, 'processor' may refer to one or more processors. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors.

Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the above description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation, and details of the methods and apparatuses disclosed herein without departing from the spirit and scope of the invention.

What is claimed is:

1. A method of operating a quantum computer to determine $\theta$ of a unitary operator U within an error $\epsilon$, wherein $U|0'\rangle = \cos(\theta)|x, 0\rangle + \sin(\theta)|x', 1\rangle$, the method comprising:
    determining a parameter $\beta \in (0,1)$ and $N_{shots}$, where $N_{shots}$ is an integer greater than 0;
    determining a probability distribution $p(\theta)$ for a set of angles $\theta$;
    for k=1 to K:
        initializing $N_{k0}=0$ and $N_{k1}=0$;
        for i=1 to $N_{shots}$:
            sequentially executing, by the quantum computer, the unitary operator $$U\left\lceil k^{\frac{1-\beta}{2\beta}} \right\rceil$$

times;
            measuring, by the quantum computer, a qubit of the resulting quantum state; and
            updating a value of $N_{k0}$ or $N_{k1}$ based on the measured value of the qubit; and
        performing a Bayesian update to the probability distribution $p(\theta)$ based on the updated values of $N_{k0}$ and $N_{k1}$; and
    determining $\theta$ based on the updated probability distribution.

2. The method of claim 1, wherein a total number of times the unitary operator U is executed on the quantum computer to determine $\theta$ scales as $O(1/\epsilon^{1+\beta})$.

3. The method of claim 1, wherein the number of times the unitary operator U is sequentially executed in a single run scales as $$O\left(\frac{1}{\epsilon^{1-\beta}}\right).$$

4. The method of claim 1, wherein determining the probability distribution p(θ) for the set of angles θ comprises determining a uniform distribution for a set of angles $$\theta = \frac{\pi t \epsilon}{2},$$

where ($t \in [0, 1/\epsilon]$).

5. The method of claim 1, wherein updating the value of $N_{k0}$ or $N_{k1}$ based on the measured value of the qubit comprises:
responsive to the measured value of the qubit being 0, updating the value of $N_{k0}$ to be $N_{k0}+1$; and
responsive to the measured value of the qubit being 1, updating the value of $N_{k1}$ to be $N_{k1}+1$.

6. The method of claim 1, wherein performing the Bayesian update includes $p(\theta) \to p(\theta)\cos((2m_k+1)\theta)^{N_{k0}} \sin((2m_k+1)\theta)^{N_{k1}}$ for $\theta=\pi t \epsilon/2$ for integer $t \in [0, 1/\epsilon]$, where $$m_k = \left\lfloor k^{\frac{1-\beta}{2\beta}} \right\rfloor.$$

7. The method of claim 1, wherein the θ corresponds to a highest probability of the updated probability distribution.

8. The method of claim 1, wherein β is determined based on noise of the quantum computer.

9. The method of claim 1, wherein θ is determined within error E with probability at least 0.9.

10. The method of claim 1, wherein $$K = \max\left(\frac{1}{\epsilon^{2\beta}}, \log(1/\epsilon)\right).$$

11. A method of operating a quantum computer to determine θ of a unitary operator U within an error ε, wherein $U|0'\rangle = \cos(\theta)|x, 0\rangle + \sin(\theta)|x', 1\rangle$, the method comprising:
determining integer parameters k and q, where k≥2 and 1≤q≤(k−1);
determining a set of k co-prime moduli $(n_1, n_2, \ldots, n_k)$, where $N = \Pi_{i \in [k]} n_i$ is equal to or greater than π/ε;
partitioning the set of k co-prime moduli $(n_1, n_2, \ldots, n_k)$ into [k/q] groups $\pi_i$ of size at most q;
for i=1 to [k/q]:
for a number of iterations:
executing, by the quantum computer, the unitary operator U to generate a quantum state $|\phi_{(N-N_i)/2N_i}\rangle$ defined by $|\phi_\mu\rangle = \cos((2\mu+1)\theta)|x, 0\rangle + \sin(2\mu+1)\theta)|x', 1\rangle$, where $N_i = \Pi_{j \in \pi_i} n_j$;
measuring, by the quantum computer, the quantum state; and
recording the measured quantum state; and
determining $\overline{M_I}$ based on an observed probability of measuring 0 for a qubit;
constructing $\overline{M}$ mod N by applying a Chinese Remainder Theorem to values based on $\overline{M_I}$; and
determining θ based on $\overline{M}$.

12. The method of claim 11, wherein a total number of times U is executed on the quantum computer to determine θ scales as $O(1/\epsilon^{1+q/k})$.

13. The method of claim 11, wherein the number of times the unitary operator U is sequentially executed in a single run scales as $O(1/\epsilon^{1-q/k})$.

14. The method of claim 11, where $|\phi_{(N-N_i)/2N_i}\rangle$ is generated by sequentially executing the unitary operator $U(2((N-N_i)/2N_i)+1)$ times.

15. The method of claim 11, wherein the number of iterations is 100 $cN_i^2$.

16. The method of claim 11, where determining $\overline{M_I}$ based on the observed probability of measuring 0 for the qubit comprises:
determining $$\hat{l} = \frac{2N_i}{\pi}$$

arccos($\sqrt{\hat{p}}$), where $\hat{p}$ is an observed probability of outcome 0; and
determining $\overline{M_I} = (-1)^t \hat{l}$ mod $N_i$, where t is based on an additive error estimate for θ.

17. The method of claim 11, further comprising:
determining $M_i = \lfloor \overline{M_I} + \beta_i \rfloor$, where $\beta_i \in [-0.25, 0.25]$ such that $\{\overline{M_I} + \beta_i\} = \alpha$ and α is a number in the interval $I = \cap_i ([\overline{M_I} - 0.25, \overline{M_I} + 0.25]$ mod 1).

18. The method of claim 17, wherein the Chinese Remainder Theorem is applied to values of $M_i$.

19. The method of claim 11, wherein determining θ based on $\overline{M}$ comprises determining θ based on $$\frac{\pi(\overline{M} + \alpha)}{2N},$$

wherein α is a number in the interval $I = \cap_i ([\overline{M_I} - 0.25, \overline{M_I} + 0.25]$ mod 1).

20. The method of claim 11, wherein θ is determined within error E with probability at least p, where $1 - 2ke^{-2c} > p$ for constant c.

* * * * *

UNITED STATES PATENT AND TRADEMARK OFFICE
CERTIFICATE OF CORRECTION

PATENT NO. : 12,141,656 B2
APPLICATION NO. : 17/532388
DATED : November 12, 2024
INVENTOR(S) : Giurgica-Tiron et al.

Page 1 of 1

It is certified that error appears in the above-identified patent and that said Letters Patent is hereby corrected as shown below:

In the Claims

In Column 39, in Claim 9, Line 31, delete "E" and insert -- $\epsilon$ --, therefor.

In Column 39, in Claim 11, Line 52, delete "+sin(2µ+1)" and insert -- +sin((2µ+1) --, therefor.

In Column 40, in Claim 20, Line 50, delete "E" and insert -- $\epsilon$ --, therefor.

Signed and Sealed this
Seventh Day of January, 2025

Derrick Brent
*Acting Director of the United States Patent and Trademark Office*